United States Patent
Bao et al.

(10) Patent No.: US 12,445,880 B2
(45) Date of Patent: Oct. 14, 2025

(54) PROCESSING WINDOW DESIGN FOR POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/652,344

(22) Filed: May 1, 2024

(65) Prior Publication Data

US 2024/0284216 A1 Aug. 22, 2024

Related U.S. Application Data

(62) Division of application No. 17/490,229, filed on Sep. 30, 2021, now Pat. No. 12,015,941.

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0048* (2013.01); *H04L 41/0803* (2013.01); *H04W 8/24* (2013.01)

(58) Field of Classification Search
CPC ............ H04L 41/0803; H04W 64/003; H04W 4/029; H04W 48/16; H04W 24/10; H04W 72/542; H04W 56/0065
See application file for complete search history.

(56) References Cited

U.S. PATENT DOCUMENTS

2012/0264449 A1 10/2012 Kazmi et al.
2013/0260793 A1 10/2013 Lim et al.
(Continued)

FOREIGN PATENT DOCUMENTS

WO 2020014107 1/2020
WO 2020146739 A1 7/2020
(Continued)

OTHER PUBLICATIONS

CATT: "Discussion on Mitigating UE and gNB Rx/Tx Timing Errors", 3GPP TSG RAN WG1 #106-e, R1-2106971, 3rd Generation Partnership Project (3GPP), Mobile Competence Centre, 650, Route Des Lucioles, F-06921 Sophia-Antipolis Cedex, France, Aug. 16-27, 2021, pp. 1-12.
(Continued)

*Primary Examiner* — Yee F Lam
(74) *Attorney, Agent, or Firm* — Weaver Austin Villeneuve & Sampson LLP

(57) ABSTRACT

Techniques are provided in which a target UE can be provided with a processing window (PW) configuration that defines a PW during which the target UE may measure one or more RS resources. The PW optionally may allow the target UE to transmit an uplink (UL) RS. The PW configuration may be provided to the target UE by a serving base station of the target UE in response to a request for the PW configuration by the target UE or a location server. The request may include information regarding an RS configuration provided to the target UE.

17 Claims, 22 Drawing Sheets

(51) Int. Cl.
*H04L 41/0803* (2022.01)
*H04W 8/24* (2009.01)

(56) References Cited

U.S. PATENT DOCUMENTS

| | | | |
|---|---|---|---|
| 2021/0112522 A1 | 4/2021 | Kim et al. | |
| 2021/0360578 A1* | 11/2021 | Manolakos | H04W 64/006 |
| 2022/0110085 A1* | 4/2022 | Khoryaev | H04W 64/003 |
| 2023/0041835 A1 | 2/2023 | Va et al. | |
| 2023/0063450 A1* | 3/2023 | Fakoorian | H04L 5/0051 |
| 2023/0099307 A1 | 3/2023 | Bao et al. | |
| 2024/0163829 A1* | 5/2024 | Fakoorian | H04L 5/0098 |
| 2024/0323883 A1* | 9/2024 | Jalden | G01S 5/0205 |

FOREIGN PATENT DOCUMENTS

| | | | | |
|---|---|---|---|---|
| WO | 2021162819 A1 | | 8/2021 | |
| WO | WO-2023277740 A1 | * | 1/2023 | G01S 5/0205 |

OTHER PUBLICATIONS

Huawei., et al., "DL PRS Design for NR Positioning", 3GPP TSG RAN WG1 Meeting #98bis, R1-1910033, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019, 13 Pages, XP051808393, Chapter 2.12, p. 11.

International Search Report and Written Opinion—PCT/US2022/075300—ISA/EPO—Dec. 8, 2022.

Moderator (CATT): "FL Summary #4 for Accuracy Improvements by Mitigating UE Rx/Tx and/or gNB Rx/Tx Timing Delays", 3GPP TSG RAN WG1 Meeting #106-e, R1-2108244, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16-27, 2021, Sep. 20, 2021, 118 Pages, XP052059935, p. 93, First Agreement (Before R1-2108244).

Moderator (CATT): "FL Summary #5 for Accuracy Improvements by Mitigating UE Rx/Tx and/or gNB Rx/Tx Timing Delays", 3GPP TSG RAN WG1 Meeting #106-e, R1-2108245, 3GPP, Mobile Competence Centre, 650, Route Des Lucioles, F-06921 Sophia-Antipolis Cedex, France, vol. RAN WG1, No. e-meeting, Aug. 16, 2021-Aug. 27, 2021, Aug. 27, 2021, 118 Pages, XP052042730, Chapter 5.1, Measurement Time Window, p. 99, 101 Both Proposals of 5-1 (H), p. 103.

Moderator (Huawei): "FL Summary #4 of 8.5.4 Latency Improvements for DL and DL+UL Methods", 3GPP TSG-RAN WG1 Meeting #106-e, R1-2108583, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 27, 2021, 77 Pages, XP052042843, p. 33 from First to Second Comment by Qualcomm, p. 53-61.

Qualcomm Incorporated: "On-Demand DL-PRS", 3GPP TSG-RAN WG2 Meeting #115-e, R2-2108384, 3rd Generation Partnership Project (3GPP), Mobile Competence Centre, 650, Route Des Lucioles, F-06921 Sophia-Antipolis Cedex, France, vol. RAN WG2, No. Electronic, Aug. 16, 2021-Aug. 27, 2021, Aug. 6, 2021, pp. 1-7, XP052034780, 7.X-7.X.5.

VIVO: "Discussion on Latency Enhancement for NR Positioning", 3GPP TSG RAN WG1 #106-e, R1-2106598, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 20 Pages, XP052037904, Chapter 3.1.1, p. 6, 9, Option 5—p. 10, Including Proposal 8.

European Search Report—EP24221034—Search Authority—Munich—Apr. 7, 2025.

MCC Support: "Draft Report of 3GPP TSG RAN WG1 #106-e v0.2.0 (Online meeting, Aug. 16-27, 2021)", 3GPP TSG RAN WG1 Meeting #106bis-e, R1-210xxxx, 3GPP Draft, Draft_Minutes_Report_RAN1#106- E_V020, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Sep. 20, 2021, XP052059935, 166 Pages, page 93, first agreement (before R1-2108244).

* cited by examiner

PROCESSING WINDOW DESIGN FOR POSITIONING

RELATED APPLICATIONS

This application is a divisional of U.S. application Ser. No. 17/490,229, filed Sep. 30, 2021, entitled "PROCESSING WINDOW DESIGN FOR POSITIONING", which is assigned to the assignee hereof, and incorporated herein in its entirety by reference.

BACKGROUND

The present disclosure relates generally to the field of wireless communications, and more specifically to relates to the processing of radio frequency (RF) signals for the positioning of a mobile device.

In a Fifth Generation (5G) New Radio (NR) mobile communication network, a network node (e.g., base station or reference user equipment (UE)) may transmit a reference signal (RS) that can be measured at a target UE to determine the location of the target UE using any of a variety of network-based positioning methods. An increase in a number of signals measured by the target UE can result in an increase in accuracy. The target UE can be configured to measure some signals during a measurement gap (MG), but there are limitations to how an MG may be used.

BRIEF SUMMARY

Techniques are provided in which a target UE can be provided with a processing window (PW) configuration that defines a PW during which the target UE may measure one or more RS resources. The PW optionally may allow the target UE to transmit an uplink (UL) RS. The PW configuration may be provided to the target UE by a serving base station of the target UE in response to a request for the PW configuration by the target UE or a location server. The request may include information regarding an RS configuration provided to the target UE.

An example method of coordinating reference signal (RS) processing at a user equipment (UE), according to this disclosure, may comprise receiving, at the UE, an RS configuration indicative of a timing of one or more RS resources. The method also may comprise obtaining a processing window (PW) configuration based at least in part on the RS configuration, wherein the PW configuration comprises information indicative of: one or more RS reception times of at least one PW for performing one or more measurements of the one or more RS resources, and a processing time of the at least one PW. The method also may comprise performing the one or more measurements with the UE during the one or more RS reception times of the at least one PW.

An example method of coordinating reference signal (RS) processing for a user equipment (UE), according to this disclosure, may comprise receiving, at a base station, a request for a processing window (PW) configuration for the UE, wherein the base station comprises a serving base station of the UE, and the request includes information indicative of an RS configuration, the RS configuration indicative of a timing of one or more RS resources. The method also may comprise determining, at the base station, the PW configuration based at least in part on the information indicative of the RS configuration, wherein the PW configuration comprises information indicative of: one or more RS reception times of at least one PW for performing one or more measurements of the one or more RS resources, and a processing time of the at least one PW.

An example user equipment (UE) for coordinating reference signal (RS) processing, according to this disclosure, may comprise a transceiver, a memory, one or more processors communicatively coupled with the transceiver and the memory, wherein the one or more processors are configured to receive, via the transceiver, an RS configuration indicative of a timing of one or more RS resources. The one or more processors further may be configured to obtain a processing window (PW) configuration based at least in part on the RS configuration, wherein the PW configuration comprises information indicative of: one or more RS reception times of at least one PW for performing one or more measurements of the one or more RS resources, and a processing time of the at least one PW. The one or more processors further may be configured to perform the one or more measurements, using the transceiver, during the one or more RS reception times of the at least one PW.

An example base station for coordinating reference signal (RS) processing for a user equipment (UE), according to this disclosure, may comprise a transceiver, a memory, one or more processors communicatively coupled with the transceiver and the memory, wherein the one or more processors are configured to receive, via the transceiver, a request for a processing window (PW) configuration for the UE, wherein: the base station comprises a serving base station of the UE, and the request includes information indicative of an RS configuration, the RS configuration indicative of a timing of one or more RS resources. The one or more processors further may be configured to determine the PW configuration based at least in part on the information indicative of the RS configuration, wherein the PW configuration comprises information indicative of: one or more RS reception times of at least one PW for performing one or more measurements of the one or more RS resources, and a processing time of the at least one PW.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
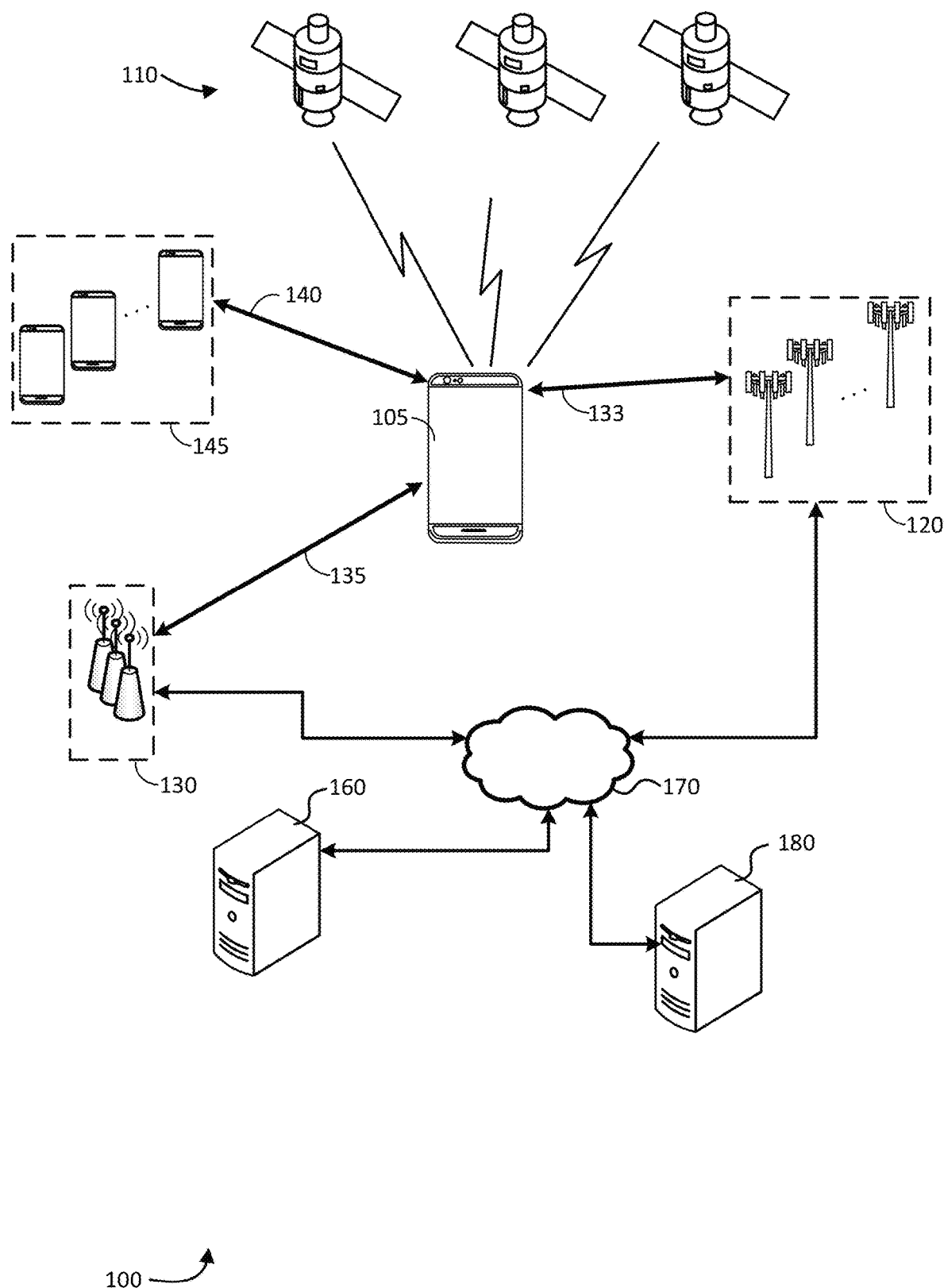
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). Such a signal is generically referred to herein as a reference signal (RS). As described in more detail herein, such signals may comprise any of a variety of signal types but may not necessarily be limited to a Positioning Reference Signal (PRS) as defined in relevant wireless standards.

As described in further detail hereafter, embodiments herein allow for the use by a UE of a processing window (PW) for processing reference signals for positioning the UE. According to some embodiments, this can be done without the use of a measurement gap (MG), allowing the UE to measure reference signals inside an active downlink (DL) bandwidth part (BWP). Such measurements may be used alone or in conjunction with other measurements (e.g., which may have utilized an MG) for positioning of the UE. Additional details will follow after an initial description of relevant systems and technologies.

FIG. 1 is a simplified illustration of a positioning system 100 in which a UE 105, location server 160, and/or other components of the positioning system 100 can use the techniques provided herein for PW design for positioning of the UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
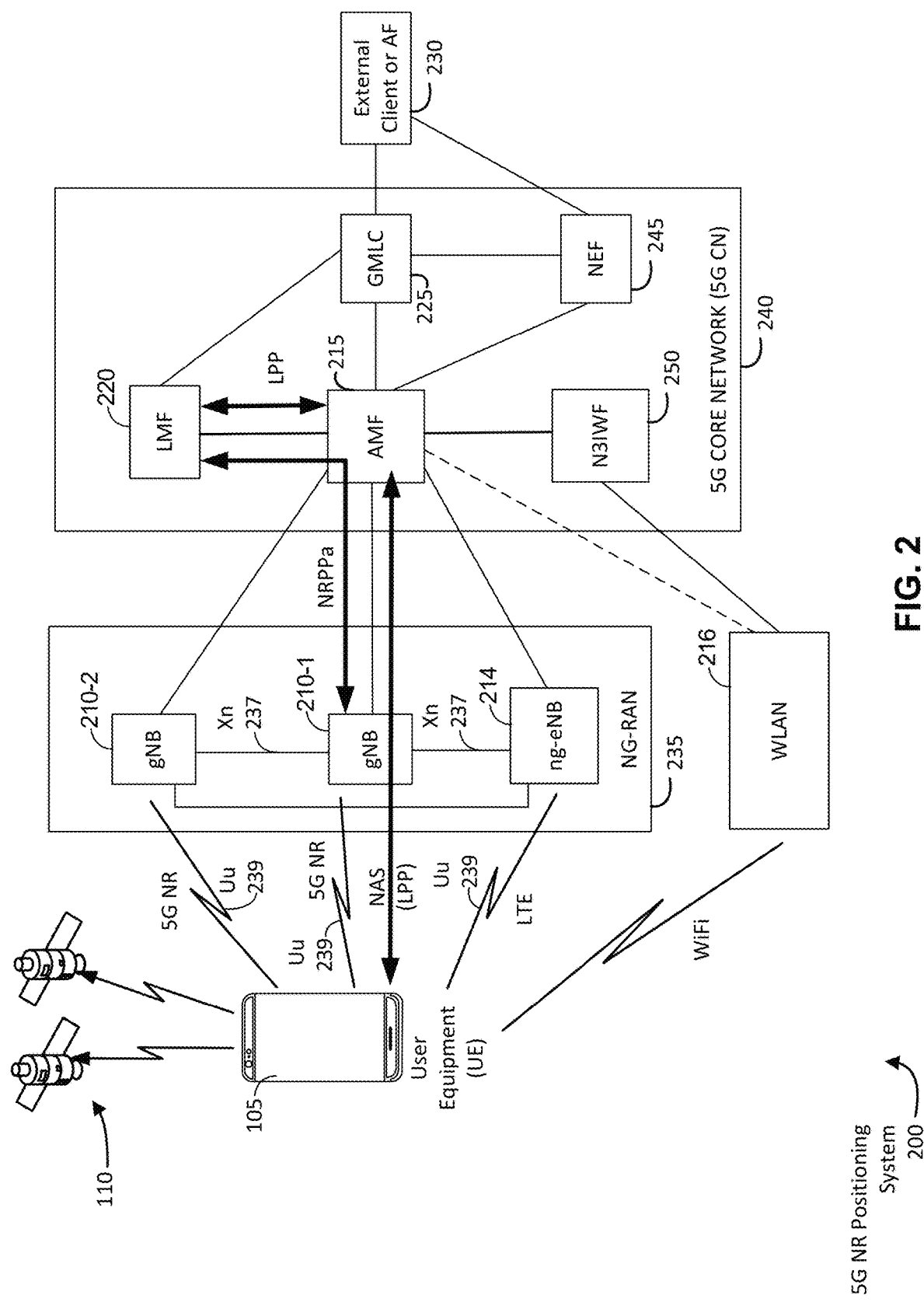
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
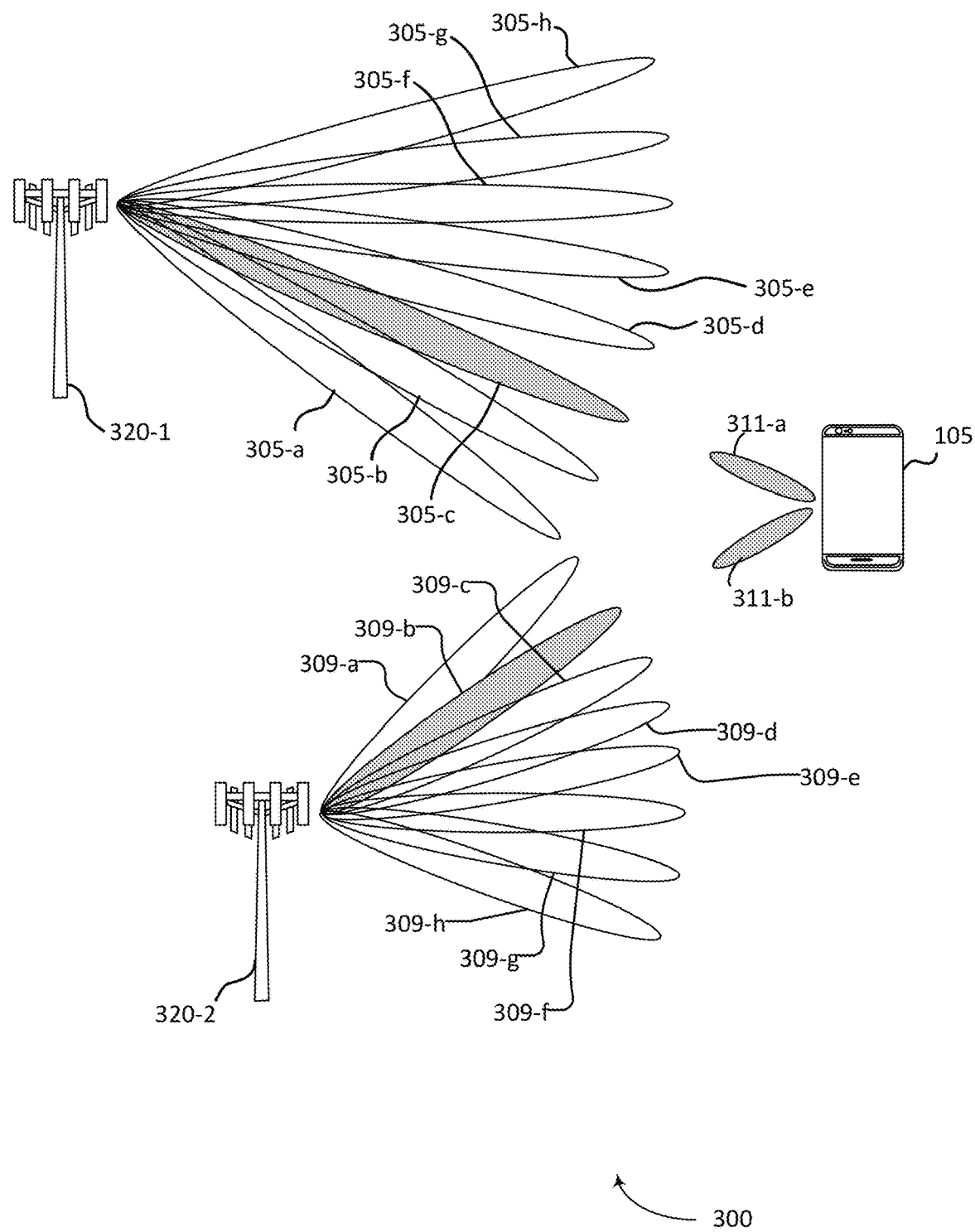
FIG. 3 is a diagram illustrating an example of beamforming that can be used by difference devices, according to some embodiments.

FIG. 3 is a diagram illustrating a simplified environment 300 including two TRPs 320-1 and 320-2 (which may correspond to base stations 120 of FIG. 1 and/or gNBs 210 and/or ng-eNB 214 of FIG. 2) with antenna arrays that can perform beamforming to produce directional beams for transmitting and/or receiving RF signals. FIG. 3 also illustrates a UE 105, which may also use beamforming for transmitting and/or receiving RF signals. Such directional beams are used in 5G NR wireless communication networks. Each of the directional beam may have a beam width centered in a different direction, enabling different beams of a TRP 320 to correspond with different areas within a coverage area for the TRP 320.

Different modes of operation may enable TRPs 320-1 and 320-2 to use a larger or smaller number of beams. For example, in a first mode of operation, a TRP 320 may use 16 beams, in which case each beam may have a relatively wide beam width. In a second mode of operation, a TRP 320 may use 64 beams, in which case each beam may have a relatively narrow beam width. Depending on the capabilities of a TRP 320, the TRP may use any number of beams the TRP 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, the UE 105 may be capable of using different numbers of beams, which may also correspond to different modes of operation, signal types, etc.

In some situations, a TRP 320 may use beam sweeping. Beam sweeping is a process in which the TRP 320 may send an RF signal in different directions using different respective beams, often in succession, effectively "sweeping" across a coverage area. For example, a TRP 320 may sweep across 120 or 360 degrees in an azimuth direction, for each beam sweep, which may be periodically repeated. Each direction beam can include an RF reference signal (e.g., a PRS resource), where base station 320-1 produces a set of RF reference signals that includes Tx beams 305-*a*, 305-*b*, 305-*c*, 305-*d*, 305-*c*, 305-*f*, 305-*g*, and 305-*h*, and the base station 320-2 produces a set of RF reference signals that includes Tx beams 309-*a*, 309-*b*, 309-*c*, 309-*d*, 309-*c*, 309-*f*, 309-*g*, and 309-*h*. As noted, because UE 320 may also include an antenna array, it can receive RF reference signals transmitted by base stations 320-1 and 320-2 using beamforming to form respective receive beams (Rx beams) 311-*a* and 311-*b*. Beamforming in this manner (by base stations 320 and optionally by UEs 105) can be used to make communications more efficient. They can also be used for other purposes, including taking measurements for position determination (e.g., AoD and AoA measurements).

Figure 4:
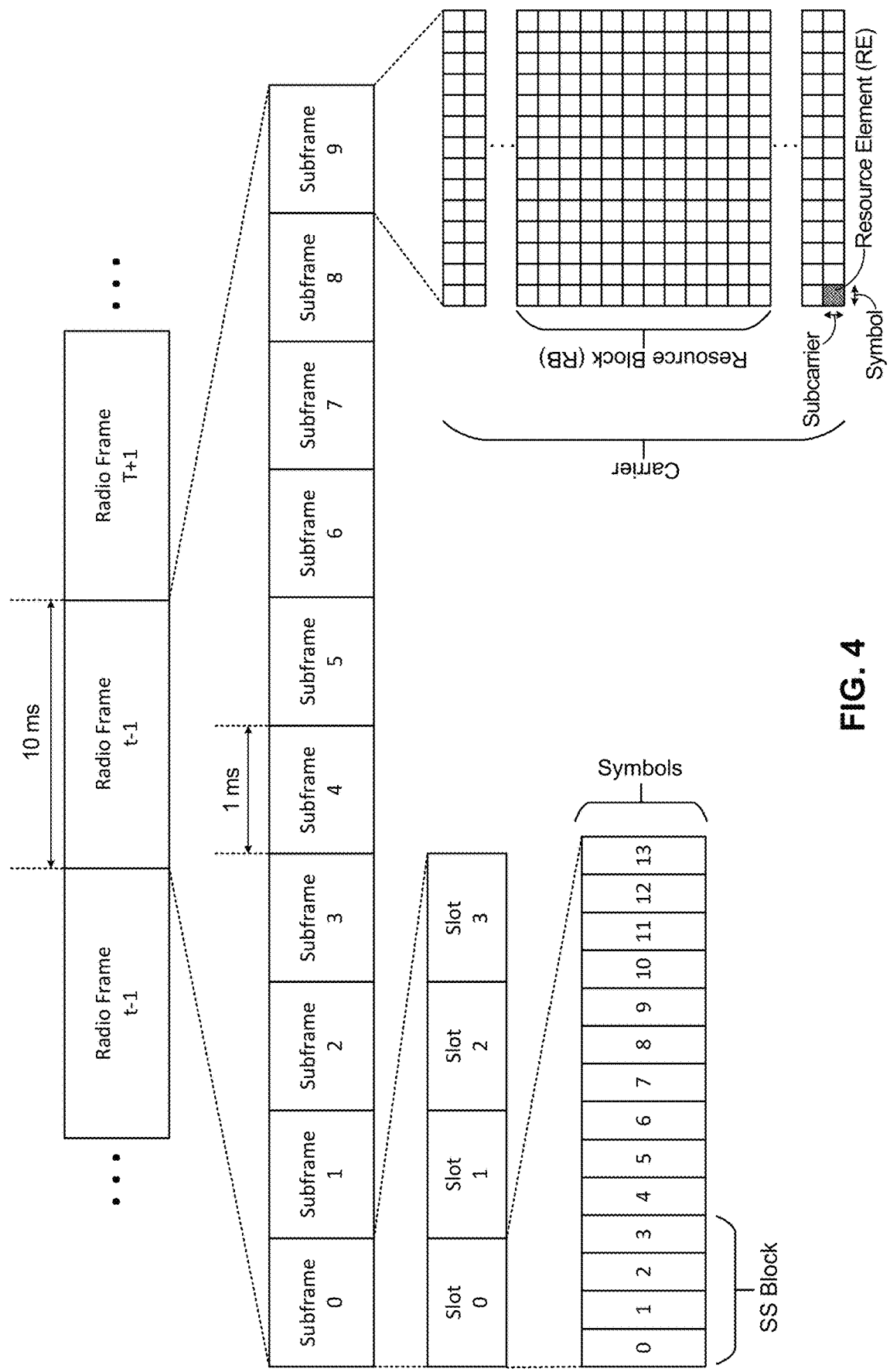
FIG. 4 is a diagram showing an example of a frame structure for NR and associated terminology.

FIG. 4 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 4 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 4. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 5:
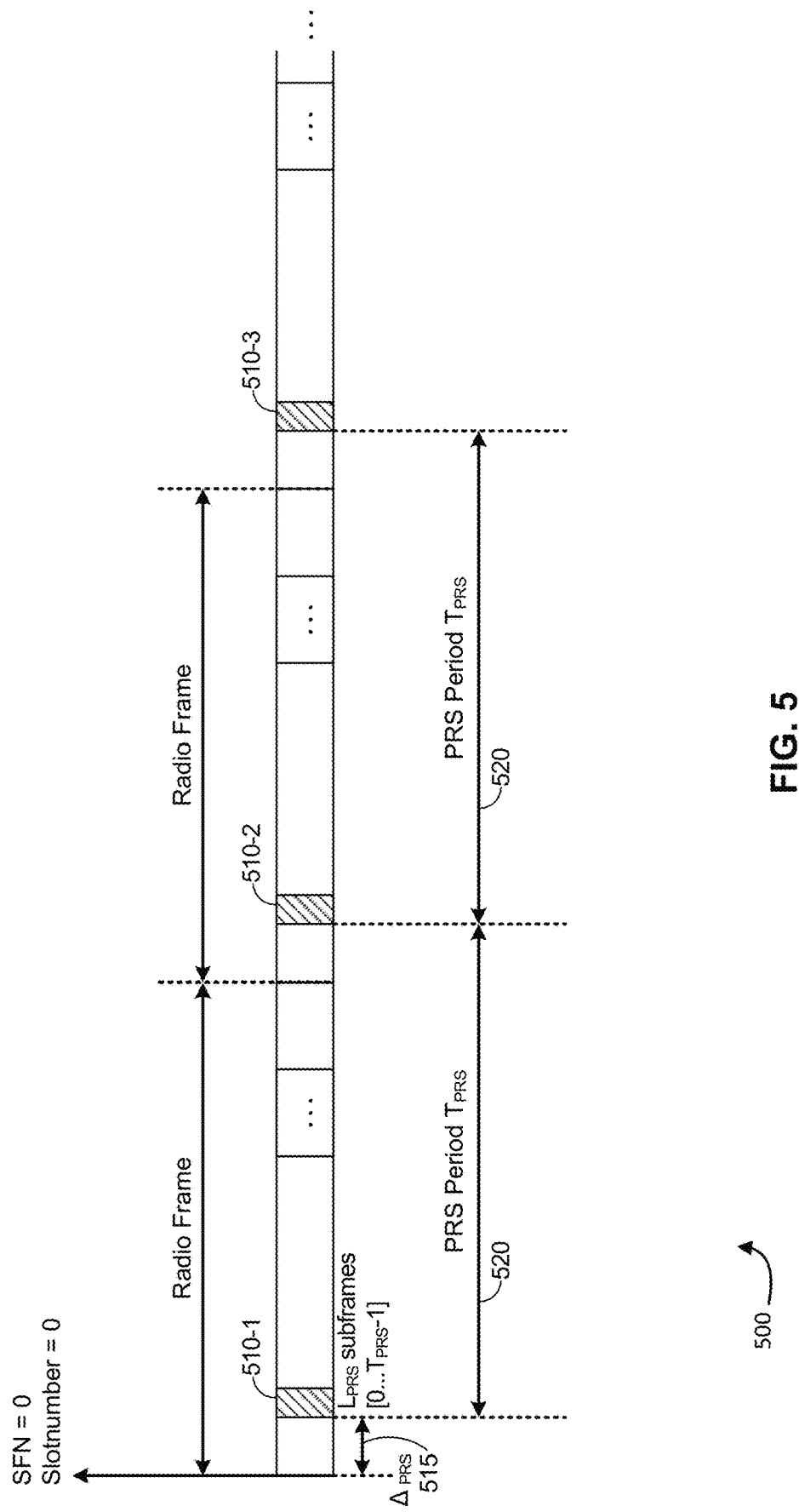
FIG. 5 is a diagram showing an example of a radio frame sequence with Positioning Reference Signal (PRS) positioning occasions.

FIG. 5 is a diagram showing an example of a radio frame sequence 500 with PRS positioning occasions. A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance." Subframe sequence 500 may be applicable to broadcast of PRS signals (DL-PRS signals) from base stations 120 in positioning system 100. The radio frame sequence 500 may be used in 5G NR (e.g., in 5G NR positioning system 200) and/or in LTE. Similar to FIG. 4, time is represented horizontally (e.g., on an X axis) in FIG. 5, with time increasing from left to right. Frequency is represented vertically (e.g., on a Y axis) with frequency increasing (or decreasing) from bottom to top.

FIG. 5 shows how PRS positioning occasions 510-1, 510-2, and 510-3 (collectively and generically referred to herein as positioning occasions 510) are determined by a System Frame Number (SFN), a cell-specific subframe offset ($\Delta_{PRS}$) 515, a length or span of $L_{PRS}$ subframes, and the PRS Periodicity ($T_{PRS}$) 520. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 515 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 510. For example, a PRS positioning occasion 510-1 can comprise a number $N_{PRS}$ of consecutive positioning subframes where the number $N_{PRS}$ may be between 1 and 160 (e.g., may include the values 1, 2, 4 and 6 as well as other values). PRS occasions 510 may be grouped into one or more PRS occasion groups. As noted, PRS positioning occasions 510 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), the UE 105 may determine the PRS periodicity $T_{PRS}$ 520 and cell-specific subframe offset ($\Delta_{PRS}$) 515 using stored indexed data. The UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 515) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 510 of the reference and neighbor cells for TDOA positioning, if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

With reference to the frame structure in FIG. 4, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular combination, or "comb," size. (Comb size also may be referred to as the "comb density.") A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS. Examples of different comb sizes using with different numbers of symbols are provided in FIG. 6.

A "PRS resource set" comprises a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). A "PRS resource repetition" is a repetition of a PRS resource during a PRS occasion/instance. The number of repetitions of a PRS resource may be defined by a "repetition factor" for the PRS resource. In addition, the PRS resources in a PRS resource set may have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (gNB 210, ng-eNB 214, and/or WLAN 216) may transmit frames, or other physical layer signaling sequences, supporting PRS signals (i.e. a DL-PRS) according to frame configurations as previously described, which may be measured and used for position determination of the UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 7:
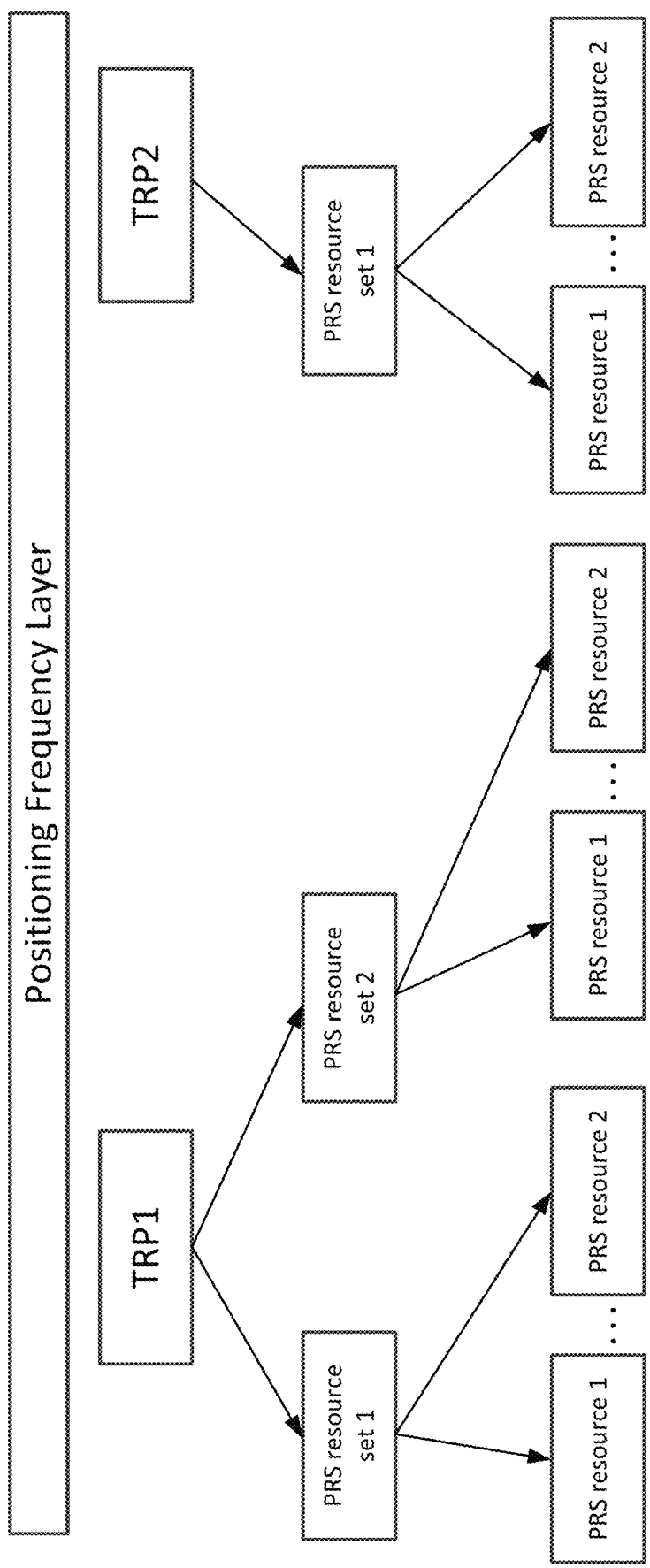
FIG. 7 is as a diagram of a hierarchical structure of how PRS resources and PRS resource sets may be used by different Transmission Reception Point (TRPs) of a given position frequency layer (PFL), as defined in 5G NR.

FIG. 7 is a diagram of a hierarchical structure of how PRS resources and PRS resource sets may be used by different TRPs of a given position frequency layer (PFL), as defined in 5G NR. With respect to a network (Uu) interface, a UE 105 can be configured with one or more DL-PRS resource sets from each of one or more TRPs. Each DL-PRS resource set includes K≥1 DL-PRS resource(s), which, as previously noted, may correspond to a Tx beam of the TRP. A DL-PRS PFL is defined as a collection of DL-PRS resource sets which have the same subcarrier spacing (SCS) and cyclic prefix (CP) type, the same value of DL-PRS bandwidth, the same center frequency, and the same value of comb size. In current iterations of the NR standard, a UE 105 can be configured with up to four DL-PRS PFLs.

NR has multiple frequency bands across different frequency ranges (e.g., Frequency Range 1 (FR1) and Frequency Range 2 (FR2)). PFLs may be on the same band or different bands. In some embodiments, they may even be in different frequency ranges. Additionally, as illustrated in FIG. 7, multiple TRPs (e.g., TRP1 and TR2) may be on the same PFL. Currently under NR, each TRP can have up to two PRS resource sets, each with one or more PRS resources, as previously described.

Different PRS resource sets may have different periodicity. For example, one PRS resource set may be used for tracking, and another PRS resource that could be used for acquisition. Additionally or alternatively, one PRS resource set may have more beams, and another may have fewer beams. Accordingly, different resource sets may be used by a wireless network for different purposes.

Figure 8:
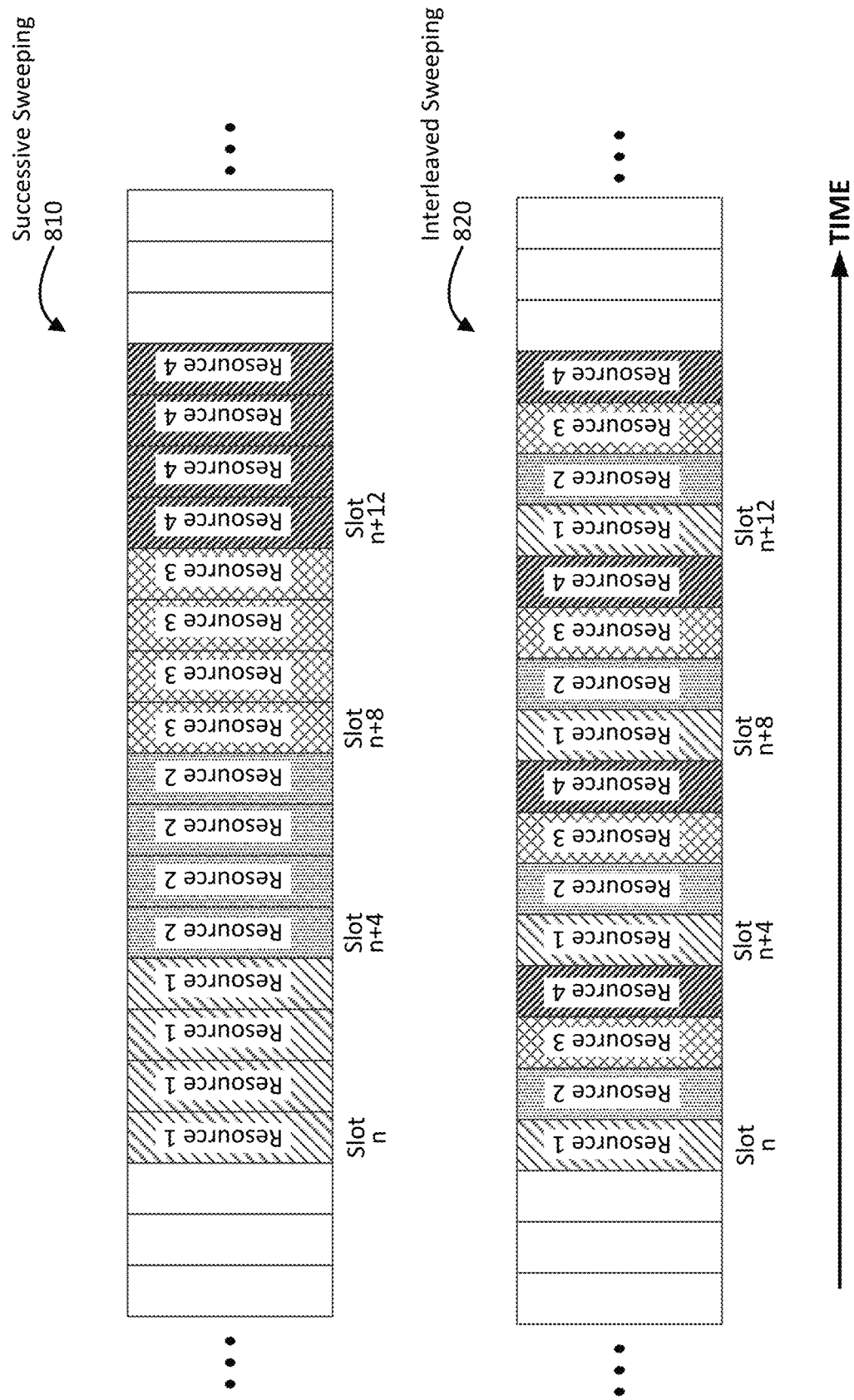
FIG. 8 is a time diagram illustrating two different options for slot usage of a resource set, according to an embodiment.

FIG. 8 is a time diagram illustrating two different options for slot usage of a resource set, according to an embodiment. Because each example repeats each resource four times, the resource set is said to have a repetition factor of four. Successive sweeping 810 comprises repeating a single resource (resource 1, resource 2, etc.) four times before proceeding to a subsequent resource. In this example, if each resource corresponds to a different beam of a TRP, the TRP repeats a beam for four slots in a row before moving to the next beam. Because each resource is repeated in successive slots (e.g., resource 1 is repeated in slots n, n+1, n+2, etc.), the time gap is said to be one slot. On the other hand, for interleaved sweeping 820, the TRP may move from one beam to the next for each subsequent slot, rotating through four beams for four rounds. Because each resource is repeated every four slots (e.g., resource 1 is repeated in slots n, n+4, n+8, etc.), the time gap is said to be one slot. Of course, embodiments are not so limited. Resource sets may comprise a different amount of resources and/or repetitions. Moreover, as noted above, each TRP may have multiple resource sets, multiple TRPs may utilize a single PFL, and a UE may be capable of taking measurements of PRS resources transmitted via multiple PFLs.

Thus, to obtain PRS measurements from PRS signals sent by TRPs and/or UEs in a network, the UE can be configured to observe PRS resources during a period of time called a measurement period. That is, to determine a position of the UE using PRS signals, a UE and a location server (e.g., LMF 220 of FIG. 2) may initiate a location session in which the UE is given a period of time to observe PRS resources and report resulting PRS measurements to the location server. As described in more detail below, this measurement period may be determined based on the capabilities of the UE.

To measure and process PRS resources during the measurement period, a UE can be configured to execute a measurement gap (MG) pattern. The UE can request a measurement gap from a serving TRP, for example, which can then provide the UE with the configuration (e.g., via Radio Resource Control (RRC) protocol).

As noted, a UE may be configured to execute an MG pattern to measure and process PRS resources of a PRS resource set outside an active DL bandwidth part (BWP) via which the UE sends and receives data with a serving TRP. To allow the network to configure the UE in a manner that accommodates the processing and buffering capabilities of the UE (which may be dynamic), the UE may provide to the network (e.g., a TRP or location server) capabilities related to PRS processing. The various parameters of the MG pattern can be configured in view of these capabilities.

Certain conditions may exist, however, where measurement gap occasions may not be needed. For example, a UE may be capable of measuring reference signals (RS) (e.g., PRS and/or other signals that may be used for positioning) outside an MG, within a reference signal processing window (PW). This can occur, for example, when the reference signal is inside the active DL BWP and has the same numerology as the active DL BWP. To perform the RS measurements and processing inside a PW, a UE may assign a higher priority for the RS operation than other DL/UL reference signal/data.

Performing measurements without using an MG can provide one or more advantages over using an MG. For example, in some instances, because a measured RS may be located within an active BWP, there may be no need to tune RF circuitry (e.g., an RF chain of a transceiver) to a separate BWP, which can save time and increase efficiency. Further, some configurations may allow a UE to continue to receive non-RS data/signaling during the PW, which again can save time and increase efficiency. Additionally or alternatively, a PW may allow a UE to transmit a UL signal, which may not be allowed during a traditional MG. This can be particularly helpful when the positioning of the UE is based on measurements of UL signals (e.g., UL-AoA, RTT, and/or other measurements utilizing UL signals from the UE). The embodiments disclosed herein utilize a PW, as discussed in more detail hereafter, and may therefore include these and other benefits.

A UE may have different abilities for performing measurements without using an MG. According to a first capability, for example, a UE may be capable of prioritizing an RS (e.g., DL PRS) over other DL signals/channels in all symbols inside the PW. This may affect DL signals/channels from all DL component carriers (CCs), or only the DL signals/channels from a certain band/CC. Additionally or alternatively, a UE may be capable of prioritizing an RS over other DL signals/channels only in the symbols inside the window used to receive the RS. In either case, the UE may be capable of providing capability information (e.g., indicating a capability of performing measurements without an MG) to a serving base station (e.g., serving gNB) and/or location server (e.g., LMF). Furthermore, a UE may determine the priority of an RS based on one or more of an indication/configuration from a serving base station, a rules-based determination (e.g., as dictated from rules of a governing specification), an indication/configuration received from a location server, or the like. Depending on desired functionality, a UE may be capable of obtaining RS measurements both inside and outside an MG for a single position determination.

Embodiments herein are directed toward PW configuration and signaling, enabling coordination of the PW between a serving base station and a UE. Because the UE may measure RS transmitted by one or more other UEs (e.g., in addition or as an alternative to RS transmitted by one or more base stations) the UE taking the measurements (and whose position will be determined) may be referred to herein as the target UE. The one or more other UEs (that transmit signals measured by the target UE), if used, may be referred to herein as anchor UEs. Techniques for configuring and signaling a PW to be used by a target UE for measuring at least one RS may include coordination between the serving base station and UE by configuration or by implicit derivation.

According to a first technique, for example, a network node (e.g., the target UE or location server) may send request to the serving base station of the target UE for configuring a PW. The request may be sent via NRPPa if the network node comprises a location server. If the network node comprises the target UE, the target UE may provide the request via Uplink Control Information (UCI) and/or Medium Access Control-Control Element (MAC-CE).

Figure 9:
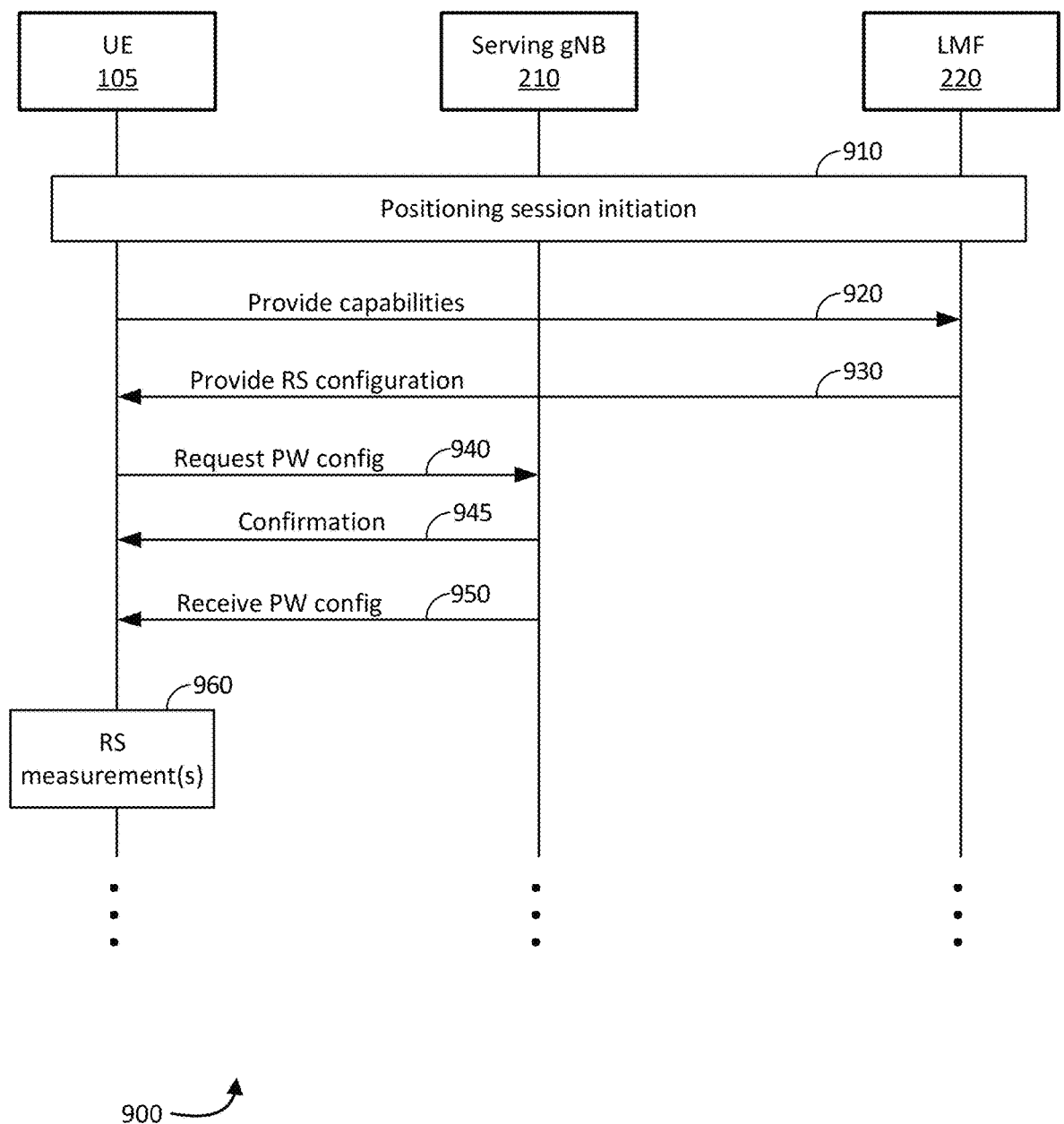
FIGS. 9 and 10 are flow diagrams illustrating examples of how a process including request for a processing window (PW) configuration from a network node may be implemented, according to some embodiments.
Figure 10:
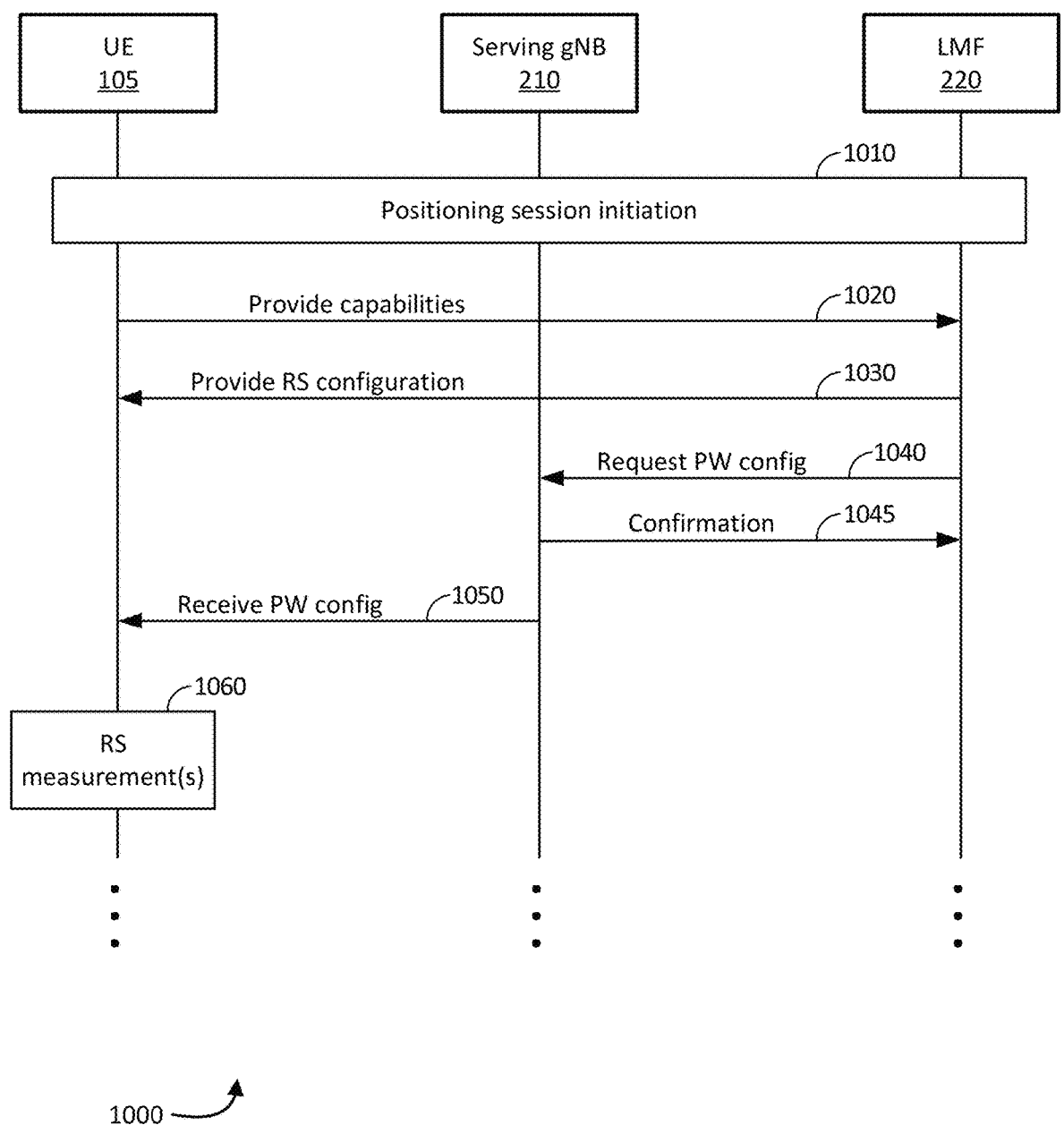

FIGS. 9 and 10 are flow diagrams illustrating examples of how the first technique (PW request from a network node) may be implemented, according to some embodiments. These processes may be part of a positioning session (e.g., LPP positioning session) between the UE 105 and LMF 220, although embodiments herein are not so limited. Communications between the UE 105 and LMF 220 may be relayed by (and transparent to) various devices, including the serving gNB 210, as illustrated in FIG. 2. Furthermore, a positioning session may include additional or alternative steps that are not illustrated in FIG. 9 or 10.

In FIG. 9, the process 900 includes the initiation of a positioning session at block 910. This may include a request for the position of the UE 105 (e.g., initiating a UE-based or UE-assisted positioning session) and a request of capabilities by the LMF 220. At arrow 920, the UE 105 provides capabilities to the LMF 220, including PW-related capabilities as described herein. More specifically, this may include an indication the UE 105 is capable of receiving various PW configurations. At arrow 930, the LMF 220 provides an RS configuration (e.g., DL-PRS configuration) to the UE 105. Because the RS configuration is indicative of when RS may be measured, the UE 105 can determine whether a PW may be used for measuring RS and, if so, request a corresponding PW configuration from the serving gNB 210, as indicated at arrow 940. According to some embodiments, the serving gNB 210 may provide confirmation or acknowledgment of the PW configuration request, as indicated at block 945. Depending on desired functionality, the RS configuration may be included in assistance data provided by the LMF 220. For its part, the serving gNB 210 provides the PW configuration, at arrow 950, and the UE 105 performs one or more corresponding RS measurements using the PW, as indicated at block 960. The measurements further may be in response to a location request (not shown) received from the LMF 220.

FIG. 10 shows an alternative embodiment in which the process 1000 has operations 1010-1060 similar to corresponding operations of process 900 of FIG. 9. However, rather than the UE 105 sending a PW configuration request (arrow 940 of FIG. 9), the LMF 220 sends the PW configuration request to the serving gNB 210 at arrow 1040. This process 1000 may be performed (e.g., rather than the process 900 of FIG. 9) to help reduce bandwidth usage between the UE 105 and a serving gNB 210.

The processes 900 and 1000 of FIGS. 9 and 10 provide a dynamic approach for PW requests and configuration. That is, a PW may be requested and configured on an as-needed basis. Additionally or alternatively, a PW a be configured by the serving gNB 210 providing a list of preconfigured PW configurations to the UE, in which case the UE may activate, deactivate, and/or switch between PW configurations based on the list of preconfigured PW configurations using UCI/MAC-CE/RRC in real time. More specifically, the list of preconfigured PW configurations may comprise a list of PW configurations preconfigured with different parameter values, and the UE may select the configuration in the list to use for a given PW. (Parameters for PW configurations are described in more detail hereafter.) In such instances, the UE 105 or LMF 220 may send a request to the serving gNB 210 to reconfigure the list of preconfigured PW configurations based on a given RS configuration (e.g., in a manner similar to requests 940 and 1040 of FIGS. 9 and 10). The list may be indexed to enable the UE to communicate the selection of the PW configuration using an index indication.

According to a second technique for configuring and signaling a PW to be used by a target UE for measuring at least one RS, rather than sending a request to the serving gNB 210 (e.g., by the UE 105 or LMF 220), a PW may be implicitly derived based on RS configuration. That is, the LMF 220 or UE 105 may send an RS configuration to the serving gNB 210, and the UE 105 and serving gNB 210 can each separately derive the PW configuration according to applicable rules (e.g., as defined in a governing specification). This can reduce latency to configure a PW for RS measurements (e.g., in a process similar to process 900 or process 1000) because the serving gNB 210 may omit providing the UE 105 with a PW configuration.

Depending on desired functionality, a PW configuration may include a combination of values for one or more different parameters. Starting time, for example, may comprise one such parameter, which may be indicated by a number of symbols, slots, subframes, or frames after reception of the PW request. Duration of the PW is another parameter, which also may be indicated by a number of symbols, slots, subframes, or frames, time. In cases where a PW comprises multiple PW occasions (e.g., similar to PRS occasions as described with respect to FIG. 5), a PW configuration may comprise an indication of periodicity, which also may be indicated by a number of symbols, slots, subframes, or frames. Additionally or alternatively, the PW configuration may include an indication of a BWP for the RS measurement(s) to be taken during the PW. According to some embodiments, the PW configuration may also include an indication of RS data, such as a priority of an RS in the PW.

The PW configuration may vary to accommodate the actions to be performed during the PW. Additional information regarding these actions and corresponding PW components are provided with respect to FIG. 11.

Figure 11:
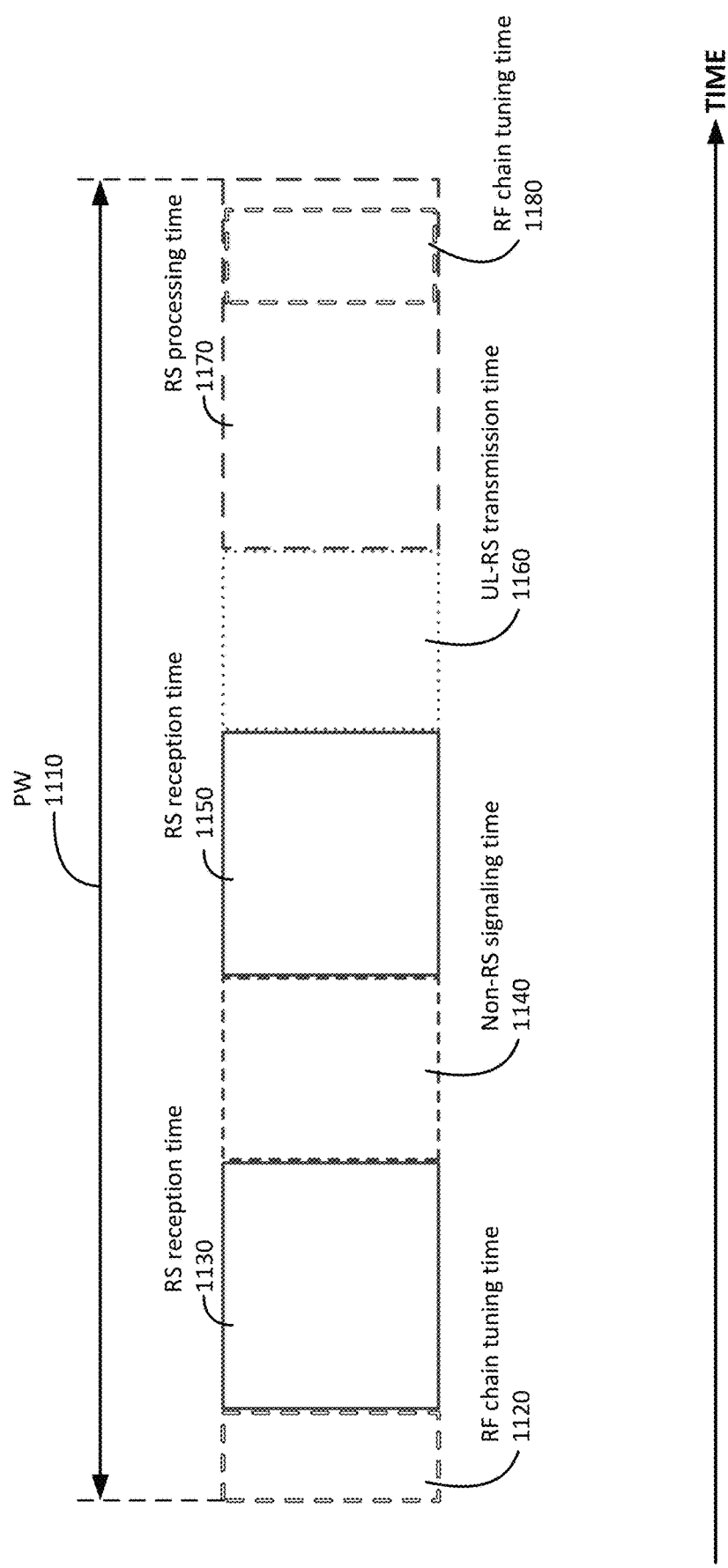
FIG. 11 is a diagram illustrating various components of a PW, according to an embodiment.

FIG. 11 is a diagram illustrating various components of a PW 1110, according to an embodiment. As illustrated, the PW 1110 may comprise an initial RF chain tuning time 1120, a first RS reception time 1130, non-RS signaling time 1140, a second RS reception time 1150, and optional UL-RS transmission time 1160 RS processing time 1170, and a final RF chain tuning time 1180. It can be noted, however, that the PW 1110 of FIG. 11 is provided as a non-limiting example. The presence and duration of different components may vary and may be accommodated by different PW configurations. In particular, the initial RF chain tuning time 1120 and final RF chain tuning time 1180 may not be present where RF chain tuning is not needed and may be based on a UE's capability. Furthermore, although two RS reception times are illustrated in FIG. 11 (first RS reception time 1130 and second RS reception time 1150), a PW may have fewer or more RS reception times, as needed. Put generally, a PW may comprise one or more times designated for RS reception. Each RS reception time and may be based on specific features of the RS (e.g., RS configuration, comb size, number of symbols, repetition, muting pattern, etc.). UL-RS transmission time 1160 may comprise a designated time for the UE to transmit a UL-RS (e.g., UL-PRS, SRS, etc.). According to some embodiments, the UL-RS transmission may be transmitted at any time during the PW 1110 although, as shown in FIG. 11, this time may be designated within a PW 1110. Because the UL-RS may not be needed in some instances, it therefore may be omitted in certain PW configurations.

To be clear, a PW may include different combinations of components as needed. RF chain tuning times (e.g., RF chain tuning times 1120 and 1180) are optional and may be included at the beginning and end of a PW if BWP switching is required for the PW, which may be based on the capability of the UE or PRS measurement requirement. As noted, one or more RS reception times (e.g., RS reception times 1130 and 1150) may be included if the UE is to measure one or more RS instances. (According to some embodiments, at least one RS reception time must be included if the PW does not include a UL-RS transmission.) Similar to the RS reception times, and RS processing time (e.g., RS processing time 1170) may be included if the UE is to measure one or more RS instances. A UL-RS transmission time (e.g., UL-RS transmission time 1160) optionally may be included, however, as noted, some embodiments may require a UL-RS transmission time if no RS reception times are included in the PW. Finally, non-RS signaling time (e.g., non-RS signaling time 1140) optionally may be included, depending on desired functionality.

The RS processing time 1170 may be based on UE's capability. In LPP, this capability may be reported by the UE to the LMF, for example, using parameters durationOfPRS-Processing and/or maxNumOfDL-PRS-ResProcessedPerSlot. It can be noted, however, that some of these parameters may assume the maximum PRS bandwidth, which may not reflect the real time bandwidth of an RS measurement during the PW. The real-time bandwidth may refer to the bandwidth of current active BWP or the overlap in bandwidth between the active BWP and the measured RS. The gNB, UE, and/or LMF may either use this parameter directly as the worst case bound or scale the processing time based on the ratio (real-time bandwidth/maximum RS bandwidth).

Figure 6:
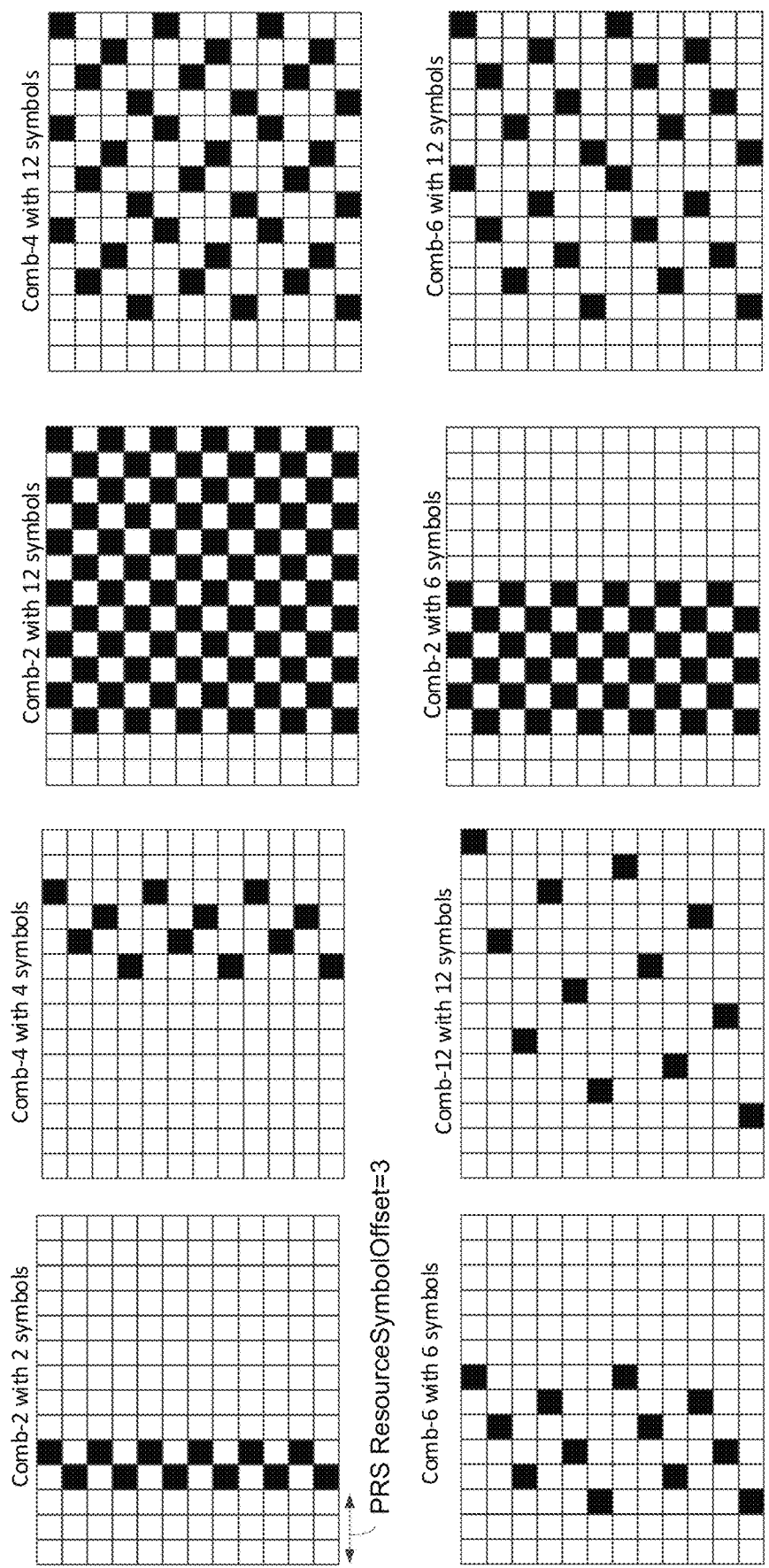
FIG. 6 is a diagram showing example combination (comb) structures, illustrating how RF signals may utilize different sets of resource elements, according to some embodiments.

Non-RS signaling time 1140 may comprise a time period within the PW 1110 during which UL and/or DL data that may be unrelated to an RS may be communicated. Although illustrated between a first RS reception time 1130 and a second RS reception time 1150, a non-RS signaling time 1140 may be located elsewhere within a PW 1110, such as between the second RS reception time 1150 and the UL-RS transmission time 1160, after the UL-RS transmission time 1160, and/or before the first RS reception time 1130, for example. This can help reduce the impact the PW 1110 has on non-RS communication. As with other features of the PW 1110, the location and duration of the non-RS signaling time 1140 may be determined in terms of symbols, slots, subframes, frames, or any combination thereof. At the symbol level, for example, non-RS signaling time may comprise unused symbols in a slot that also comprises symbols used by an RS instance. For example, (as shown in FIG. 6) where an RS instance comprises a comb-4 structure that occupies four symbols of a 14-symbol slot, the remaining 10 symbols of the slot may be designated as non-RS signaling time 1140.

Depending on desired functionality, the PW duration (e.g., as defined in a PW configuration) can be defined as N consecutive symbols, slots, subframes, frames, or any combination of these. In a first option, the duration of each PW instance may be defined at symbol level or a slot level. This can be done at a per-RS resources level, where each PW duration may span on the symbols of a slot of an RS resource and may further include RF tuning time and/or processing time, if needed. (With respect to FIG. 8, for example, one PW would be defined for each resource.) This method may create many PW fragments. Alternatively, this PW can capture all RS resources in an RS resource set, where each PW duration may span consecutive symbols of consecutive slots for all RS resources of a single RS resource set and may further include RF tuning time and/or processing time, if needed. (With respect to FIG. 8, for example, a single PW would be defined for all resources.) In a second option, a PW may be defined with a PW duration and a merge condition, enabling the PW to be merged to another PW in certain circumstances.

Thus, a device (e.g., the target UE or serving base station) may determine that the PW configuration by applying rules for determining PW based on a RS configuration. This may result in PW fragments that may be merged during a merging process. (As referred to herein, a "PW fragment" may refer to a PW prior to the merger process.) The handling of overlapping, contiguous, and/or nearby but non-contiguous PW fragments can be covered by applicable rules for merging PWs. A merge condition may comprise a condition under which different PWs may be merged.

Figure 12:
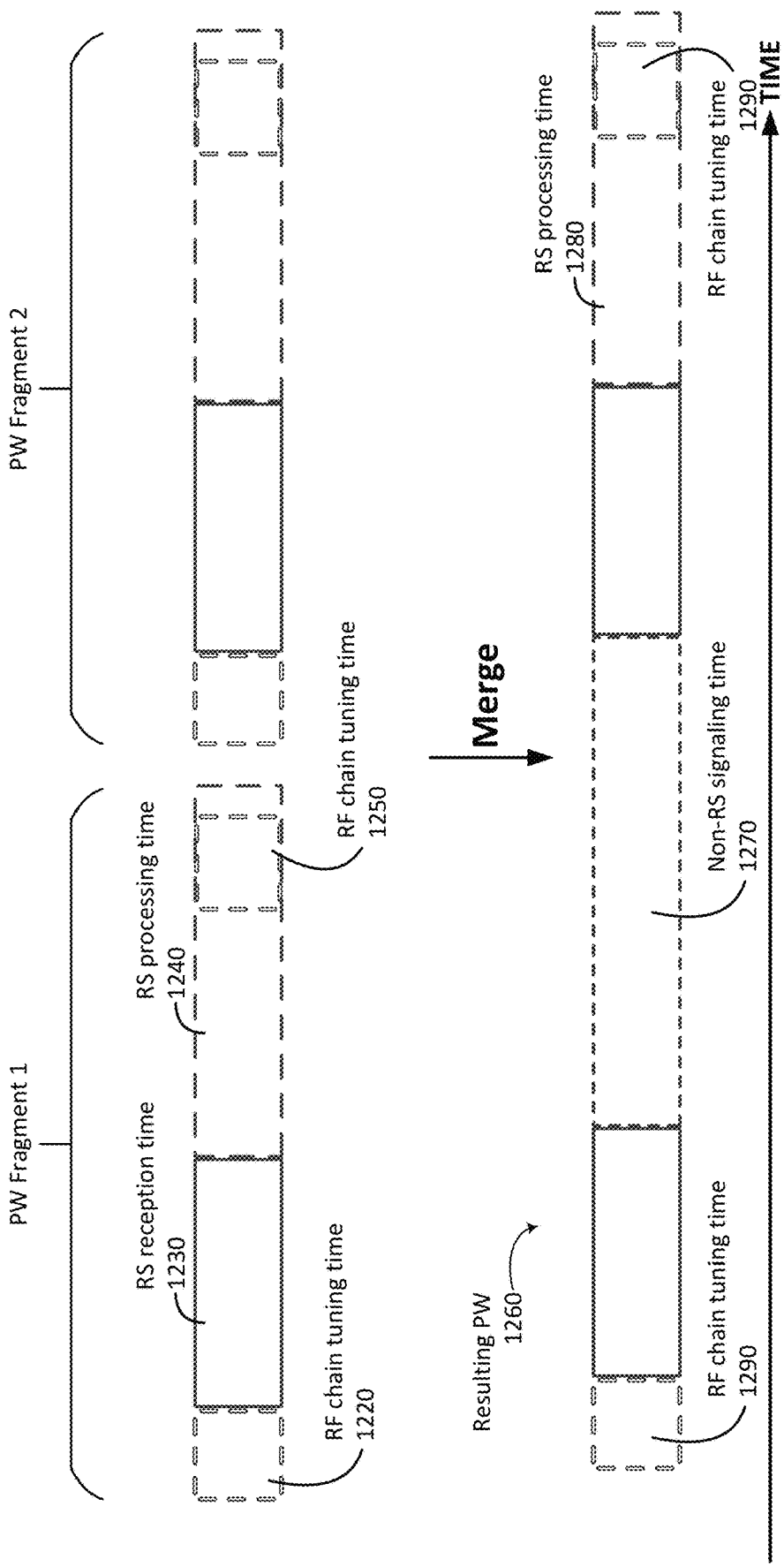
FIG. 12 illustrates a basic example of the merger of two PW fragments, according to an embodiment.

FIG. 12 illustrates a basic example of the merger of two PW fragments. Here, PW fragment 1 is followed by PW fragment 2, each having a respective initial RF chain tuning time 1220, RS reception time 1230, RS processing time 1240, and final RF chain tuning time 1250. (To avoid clutter, these components are labeled in PW fragment 1 only.) Although PW fragments do not overlap, PW fragment 1 and PW fragment 2 are close enough that a merge condition may exist wherein they may be merged as illustrated to create a resulting PW 1260. Such mergers of two PW fragments (or, more broadly, to PWs) may be made by canceling one of them and assigning overlapping time to the other. In the example in FIG. 1, for example, the second PW fragment be canceled, and time between RS reception times of each PW fragment may be designated as non-RS signaling time 1270 of the resulting PW 1260. Because the resulting PW 1260 may have only a single processing time 1280 and a single set of RF chain tuning times 1290, this can result in gains in efficiency overall.

Different types of mergers may be made depending on the type of conditions that exist. Some types of mergers discussed herein are illustrated in FIGS. 13A-15B. It can be noted that, although the example is illustrated in 13A-15B include PWs having tuning periods, some PWs may not include tuning periods, as previously noted. Nonetheless, PWs without tuning periods may be merged in a similar manner.

Figure 13A:
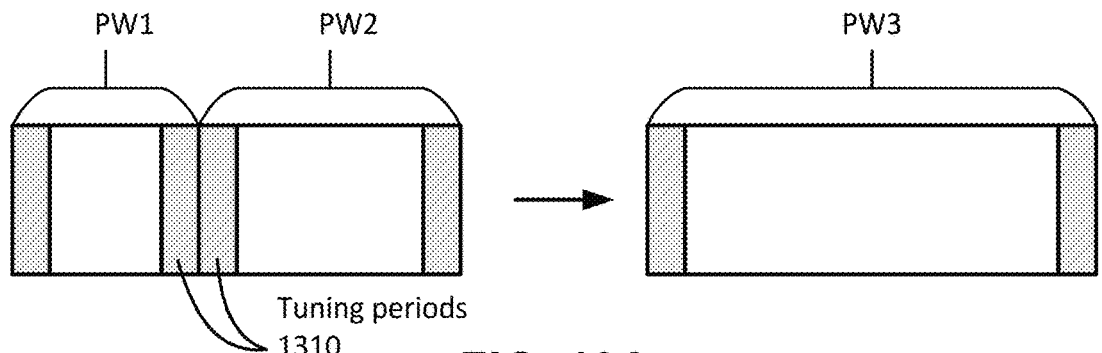
FIGS. 13A-15B are diagrams illustrating different types of mergers between PW fragments, according to different embodiments.

FIG. 13A illustrates a first type of merger in which a first PW fragment, PW1, and a second PW fragment, PW2, are merged to form a combined PW, PW3. (This convention will be used in subsequent figures as well.) In this example, each PW begins and ends with a tuning period 1310 (only two of which are labeled, to avoid clutter). Each tuning period may correspond to an RF chain tuning time 1120 or 1180, as shown in FIG. 11 and previously described. In this example, RS measurements or RS bandwidth taken in PW1 and PW2 utilize the same bandwidth, and thus the UE does not need to re-tune its RF chain between PW1 and PW2. As such, the merged PW3 combines PW1 and PW2, to allow the UE to measure RS without retuning. This type of merger can occur between any number of adjacent PWs (e.g., two or more). Moreover, because the length of the resulting PW3 may be equal to the combined lengths of PW1 and PW2, it may allow for more time for RS measurements (or other operations such as non-RS data, UL transmissions, etc.) because no re-tuning is needed.

Figure 13B:
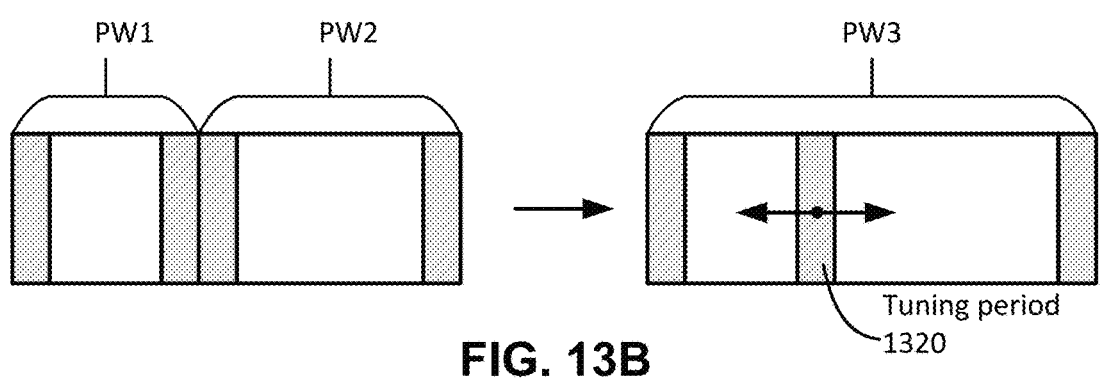

FIG. 13B illustrates a second type of merger similar to the merger illustrated in 13A. Here, however, re-tuning is needed between PW1 and PW2. As such, the resulting PW3 may include a tuning period 1320 that allows for this. The location of the tuning. 1320 within PW3 can allow for one or more measurements for different frequency allocations (including BWP, CC, frequency layer, PFL, RS). Again, because the length of the resulting PW3 may be equal to the combined lengths of PW1 and PW2, it may allow for more time for RS measurements (or other operations such as non-RS data, UL transmissions, etc.) because only one re-tuning is needed.

Figure 13C:
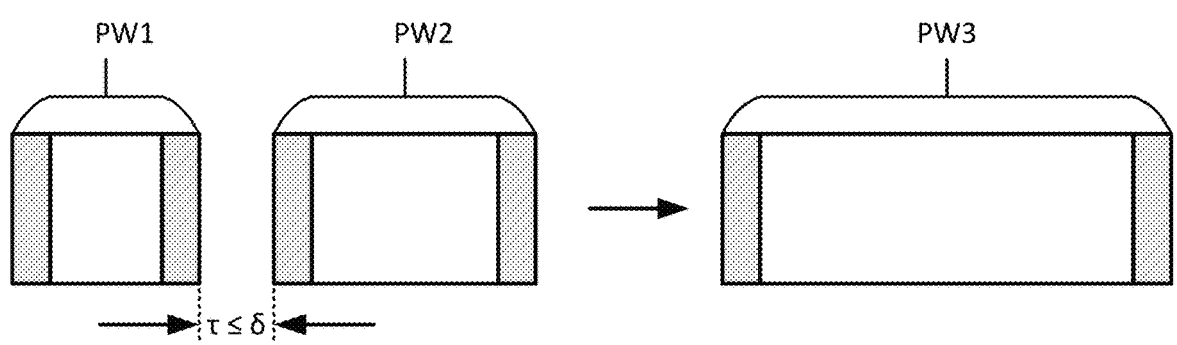

FIG. 13C illustrates a third type of merger comprising an extension of the type of merger illustrated in FIG. 13A, applied to an instance in which PW1 and PW2 are not adjacent, but instead are separated by time $\tau$. In this example, a merger condition exists when $\tau$ is less than or equal to a time threshold, $\delta$, for merging PWs. PW3 can absorb time difference $\tau$. An thus, the length of PW3 may be equal to the combined lengths of PW1 and PW2, plus $\tau$.

Figure 13D:
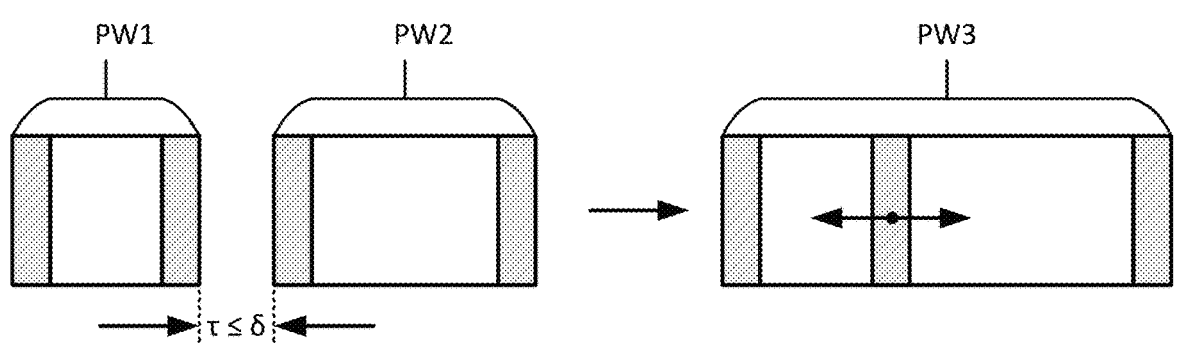

FIG. 13D illustrates a fourth type of merger comprising an extension of the type of merger illustrated in FIG. 13B, applied in a manner similar to the example of FIG. 13C. Specifically, PW1 and PW2 are not adjacent, but instead are separated by time $\tau$. The resulting PW3 includes a tuning period that can allow for re-tuning, if needed, during the PW. Similar to the example of FIG. 13B, the tuning period may be located within PW3 to allow one or more measurements for different frequency allocations. Again, the length of PW3 may be equal to the combined lengths of PW1 and PW2, plus $\tau$.

Figure 14:
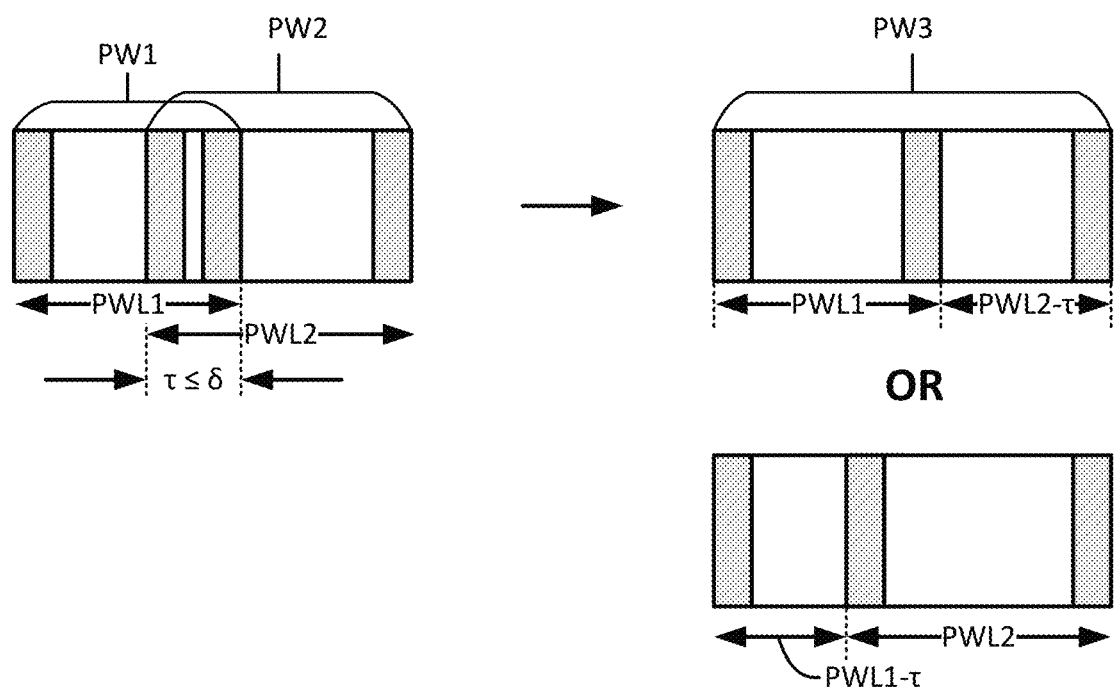

FIG. 14 illustrates merger of a first PW fragment, PW1, and a second PW fragment, PW2, that overlap in time by time period equaling $\tau$. In this example, a merger condition exists when $\tau$ is less than or equal to a time threshold, $\delta$, for merging PWs. (It can be noted that the time threshold used for merging overlapping PWs may be different than the time threshold used for merging separate PWs as illustrated in FIGS. 13C and 13D.) In FIG. 14, the length of PW1 and the length of PW2 are respectively illustrated as PWL1 and PWL2. The merger may be performed in a manner such that the resulting PW3 has a length equal to PWL1+PWL2−$\tau$. According to some embodiments, if retuning is needed, the tuning period can be located within PW3 in one of two ways, as illustrated. That is, the tuning period be located after the full PWL1, or before the full PWL2. This can be determined based on any of a variety of factors, including a start time of the PW, a length of the PW, a priority assigned to the PW (or to the RS being measured during the PW), or the like. Additionally or alternatively, the tuning period (i) may be omitted (e.g., if not needed) or (ii) may be located anywhere within PW3 to accommodate RS measurements as needed, in a manner similar to the examples shown in FIGS. 13A and 13B, respectively.

Figure 15A:
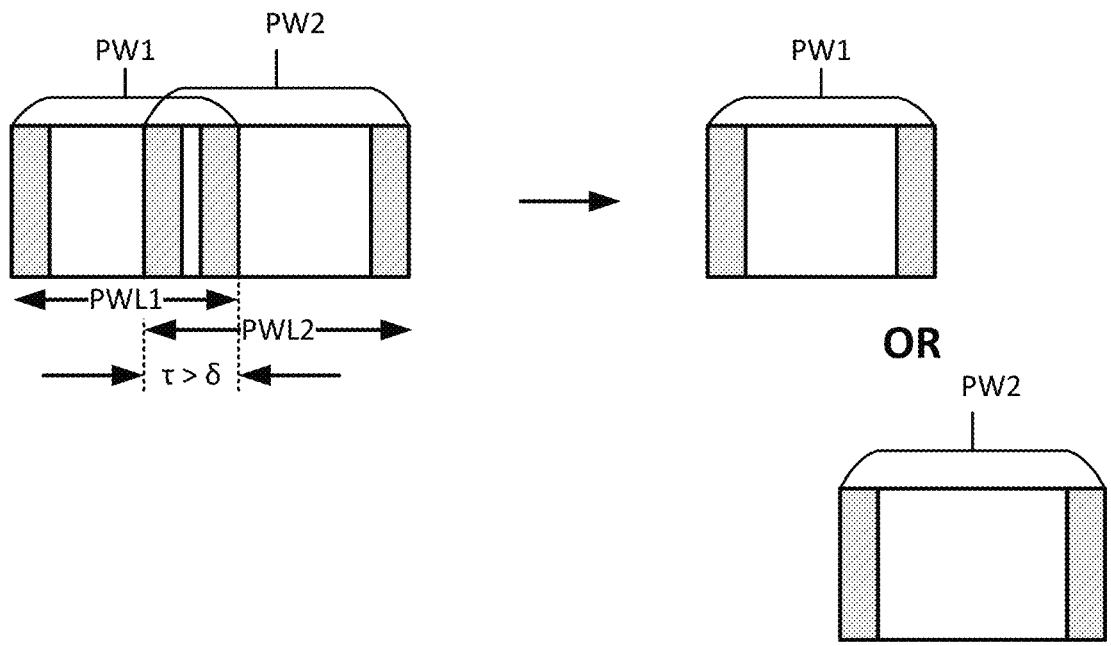

FIG. 15A is an illustration, similar to FIG. 14. Here, however, PW1 and PW2 overlap in time by a time period $\tau$ where $\tau$ is greater than the time threshold, $\delta$, for merging PWs. In this case, the resulting PW may comprise PW1 or PW2, rather than a merger of PW1 and PW2. In other words, PW1 or PW2 may simply be canceled. The decision of which PW to cancel may be based on factors similar to those discussed with regard to FIG. 14 (start time, length, priority, etc.).

Figure 15B:
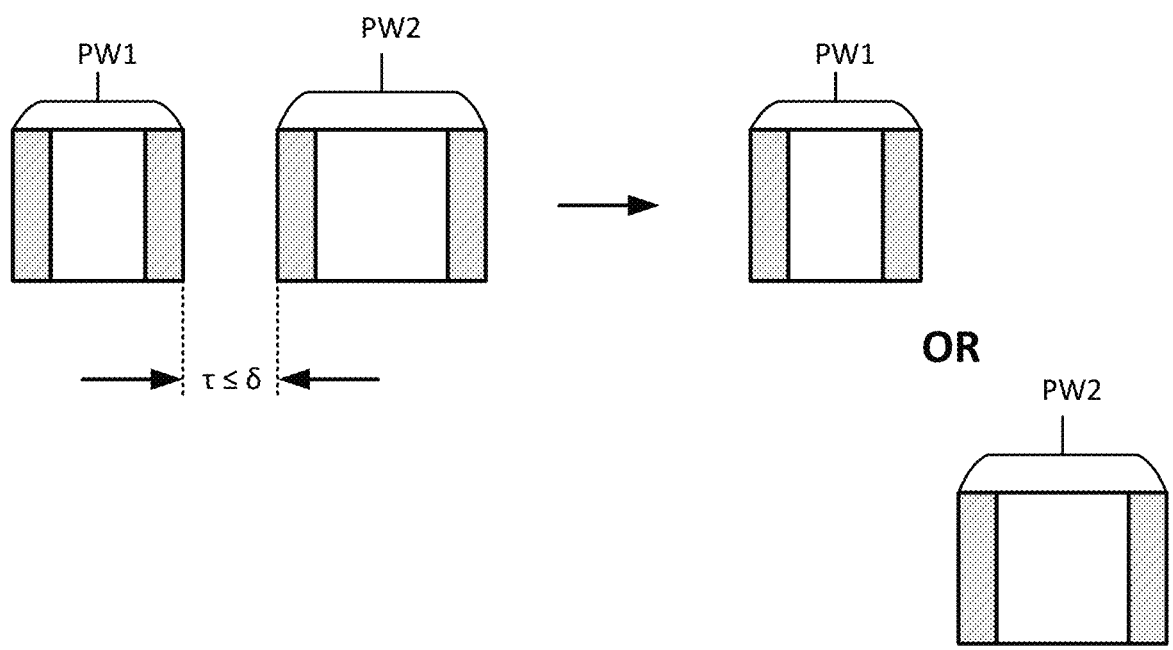

FIG. 15B is an illustration, similar to FIG. 15A, showing an instance in which PW1 or PW2 may be canceled. That is, as an alternative to merging PW1 and PW2 in the case where PW1 and PW2 are separated by a time period $\tau$ where $\tau$ is less than or equal to a time threshold, $\delta$ (e.g., as shown in FIGS. 13C and 13D), the target UE (in coordination with the network) may implement either PW1 or PW2 (effectively canceling the PW not implemented). Again, the decision of which PW fragment to cancel may be based on factors similar to those discussed with regard to FIGS. 14 and 15A (start time, length, priority, etc.), in addition to the values of $\tau$ and $\delta$. According to some embodiments, whether tuning of RF circuitry of the UE is necessary between PW1 and PW2 may be a factor. That is, if tuning is needed, then PW1 or PW2 may be canceled (e.g., based on one or more of the factors previously described). Alternatively, if no tuning is needed, then PW1 and PW2 may be merged (e.g., in the manner shown in FIG. 13C or 13D).

In the examples of merging PW fragments shown in FIGS. 13A-15B, threshold values (e.g., the value of δ as a threshold of time between PW fragments and/or as a threshold of overlap between PWs) may be determined in different ways, depending on desired functionality. According to some embodiments, the LMF or serving gNB may define threshold values (e.g., in terms of a number of symbols, slots, subframes, and/or frames) of the non-PRS time. According to some embodiments, threshold values may be set by a governing specification.

Figure 16:
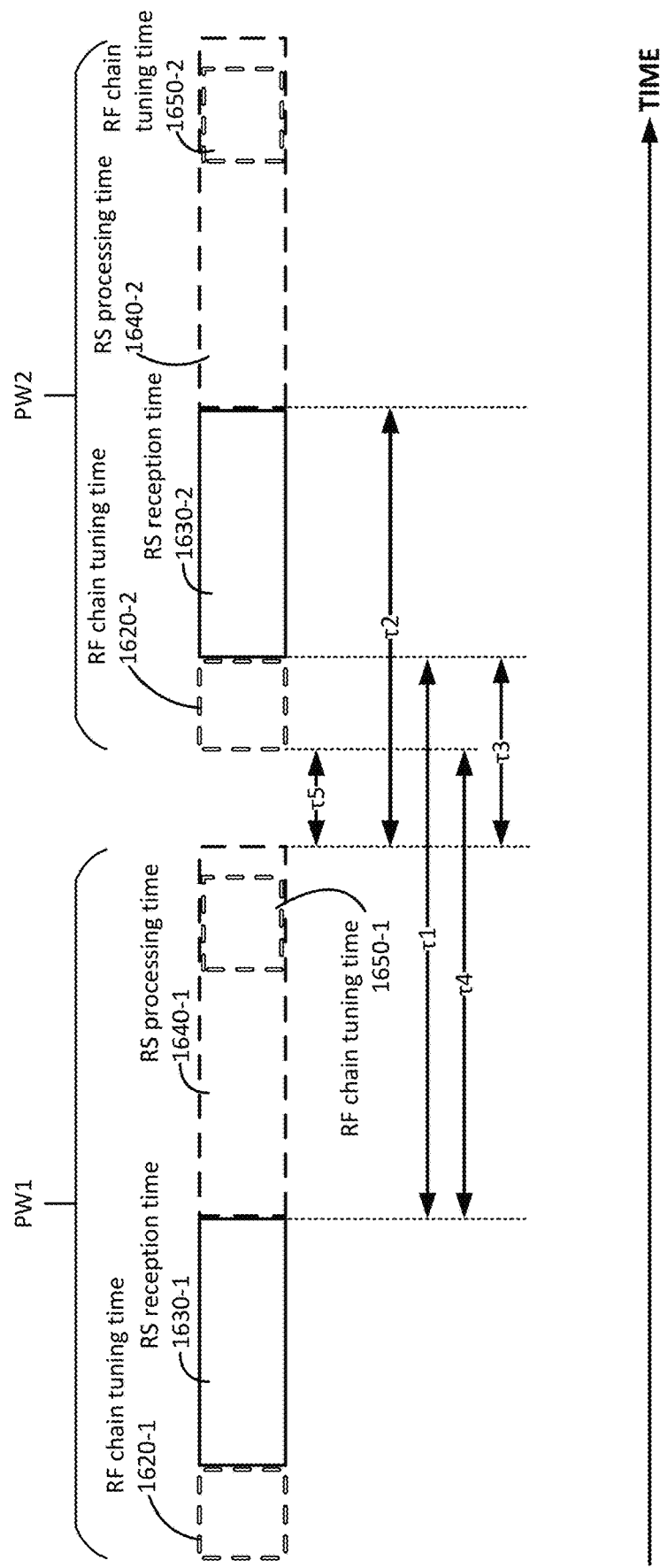
FIG. 16 is a diagram illustrating how value of time difference τ between PW fragments may be defined in different ways, depending on desired functionality.

Depending on desired functionality, the value of time difference τ between PWs (and time threshold δ) may be defined in different ways. The following examples are illustrated with respect to PW fragments PW1 and PW2 as shown in FIG. 16.

According to a first example, a first value, τ1, may be defined as a difference between end of RS reception time 1630-1 (or UL-RS transmission time, if included) in PW1 to the beginning of the RS reception time 1630-2 (or UL-RS transmission time) in PW2.

According to a third example, a third value, τ3, may be defined as a difference between the end of RS processing time 1640-1 (or RF chain tuning time 1650-1) in PW1 to the beginning of the RS reception time 1630-2 (or UL-RS transmission time) in PW2.

According to a fourth example, a fourth value, τ4, may be defined as a difference between the end of RS reception time 1630-1 (or UL-RS transmission time, if included) in PW1 to the beginning of the RF chain tuning time 1620-2 in PW2.

Finally, according to a fifth example, a fifth value, τ5, may be defined as a difference between the end of RS processing time 1640-1 (or RF chain tuning time 1650-1) in PW1 and the beginning of the RF chain tuning time 1620-2 in PW2. According to a variation of this example, τ5 may be calculated as the difference between the end of RS processing time 1640-1 or RF chain tuning time 1650-1 in PW1 (whichever is later) and the beginning of the RF chain tuning time 1620-2 or RS reception time 1630-2 (whichever is earlier) in PW2.

It can be noted that these are nonlimiting examples of how values τ may be determined. According to other embodiments, the value of τ may be determined using some other combination of beginning and/or ending times of various components of PW1 and PW2. Furthermore, it can be noted that the boundary of each PW fragment may be further shifted by a small delta caused by expected RSTD (e.g., based on different transmittal sources for different RS resources). As such, according to some embodiments, the shifted boundary, which may be rounded to the latest or earliest symbol or slot, can be used for the determination of a value for τ.

According to some embodiments, merging rules can be used to merge two or more PWs until a stopping rule is met. Similar to merging conditions, different stopping rules may be met in different circumstances. For example, according to some embodiments, a stopping rule may be met if a time gap (e.g., a value for t as provided in FIG. 13C or 13D) is larger than a threshold value. It can be noted that RS signal muting (e.g., PRS muting), which may be included as part of an RS configuration, may satisfy a stopping rule by creating a time gap larger than a threshold value. An example of this is provided in FIG. 17.

Figure 17:
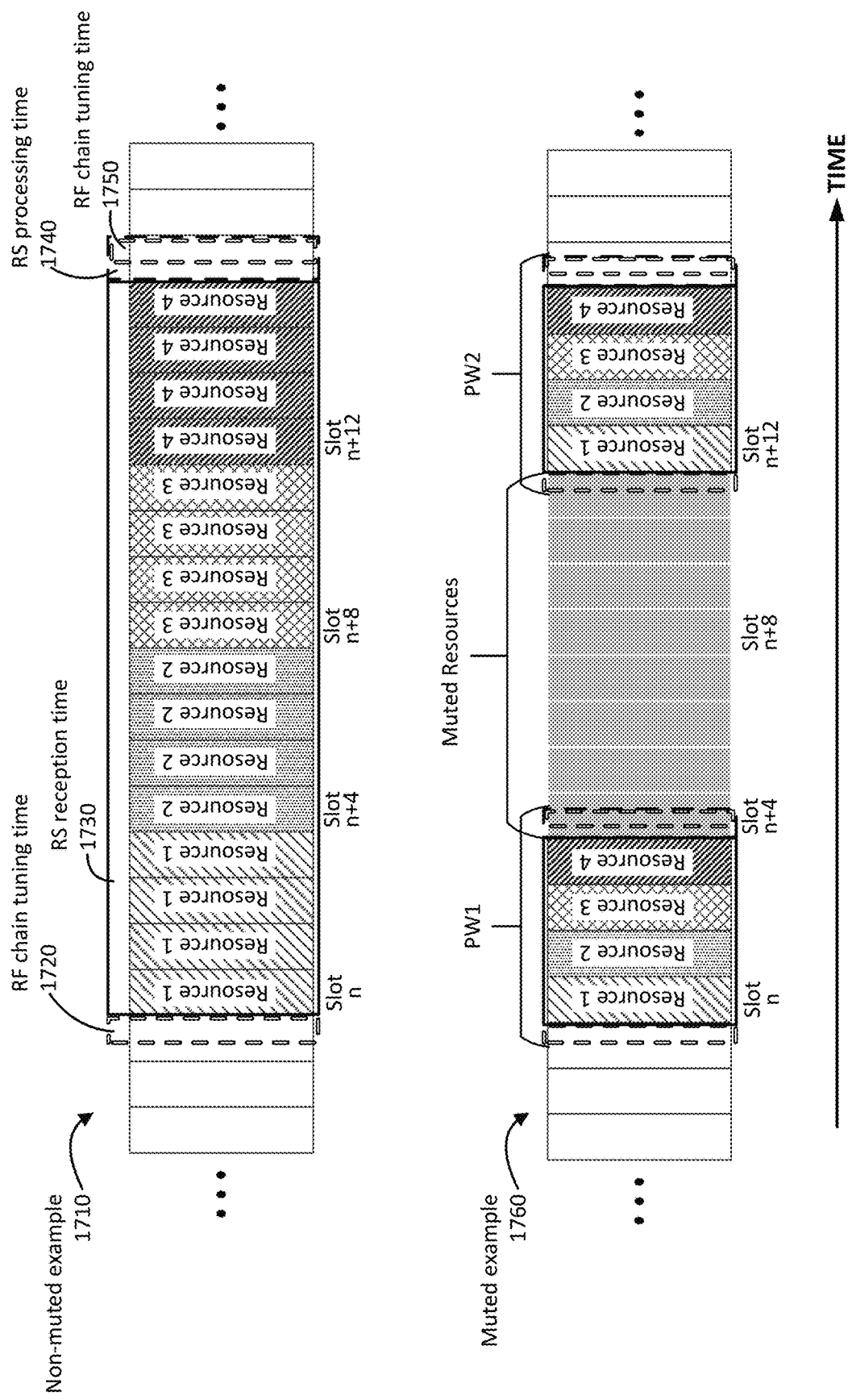
FIG. 17 is a diagram of slot usage of a resource set, similar to FIG. 8, illustrating how PWs may be determined in muted and non-muted scenarios.

FIG. 17 is a diagram of slot usage of a resource set, similar to FIG. 8, illustrating how PWs may be determined in muted and non-muted scenarios. In the non-muted example 1710, a single PW is used to measure all repetitions of all resources, where an initial RF chain tuning time 1720 is followed by an RS reception time 1730 that encompasses all repetitions of all resources. The RS reception time 1730 is then followed by an RS processing time 1740, which includes a final RF chain tuning time 1750.

In the muted example 1760, a consecutive block of resources within the resource set are muted, thereby resulting in a period of time (labeled "muted resources" in FIG. 17) between a first set of resources and a second set of resources that may be greater than a threshold value of time. If so, as illustrated, different PWs may be used to capture different sets of resources. In the example of FIG. 17, a first PW (PW1) is defined to capture a first set of resources, and a second PW (PW2) is defined to capture a second set of resources.

It can be noted that, although the non-muted example 1710 includes non-interleaved resources and the muted example 1760 includes interleaved resources, embodiments are not so limited. Muting and PW usage as illustrated in FIG. 17 may occur when resources are interleaved and/or are not interleaved.

According to some embodiments, additional or alternative stopping rules may be applied. This can include, for example, instances where a muting-caused time gap may or may not considered for a stopping rule, such as defined in a governing specification or by preference of the LMF, target UE, and/or serving gNB. Additionally or alternatively, a stopping rule may be applied when a number of RS resources in a PW reaches a processing and/or buffering capability of the target UE. For example, if a number of PRS resources in a PW reaches a limitation of processing capability of a UE (e.g., which may result in a buffer overflow) the PW merging operation may terminate for any following PW fragments.

According to some embodiments, the starting time of a PW may be based on the SFN offset, subframe offset, periodicity, and/or RS set offset. For example, a start time of a PW may be aligned on a symbol level (e.g., the first symbol of an RS resource minus the RF tuning time (if needed)) or aligned on the slot level (e.g., the slot of the first symbol of a PRS resource minus the RF tuning time (if needed)). Similarly, the end time of a PW may be defined on the symbol level or slot level. That is, the PW end time may be aligned on the symbol level (e.g., the last symbol of a PRS resource plus the processing time or RF tuning time), or aligned on the slot level (e.g., the slot of the last symbol of a PRS resource plus processing time or RF tuning time).

Figure 18:
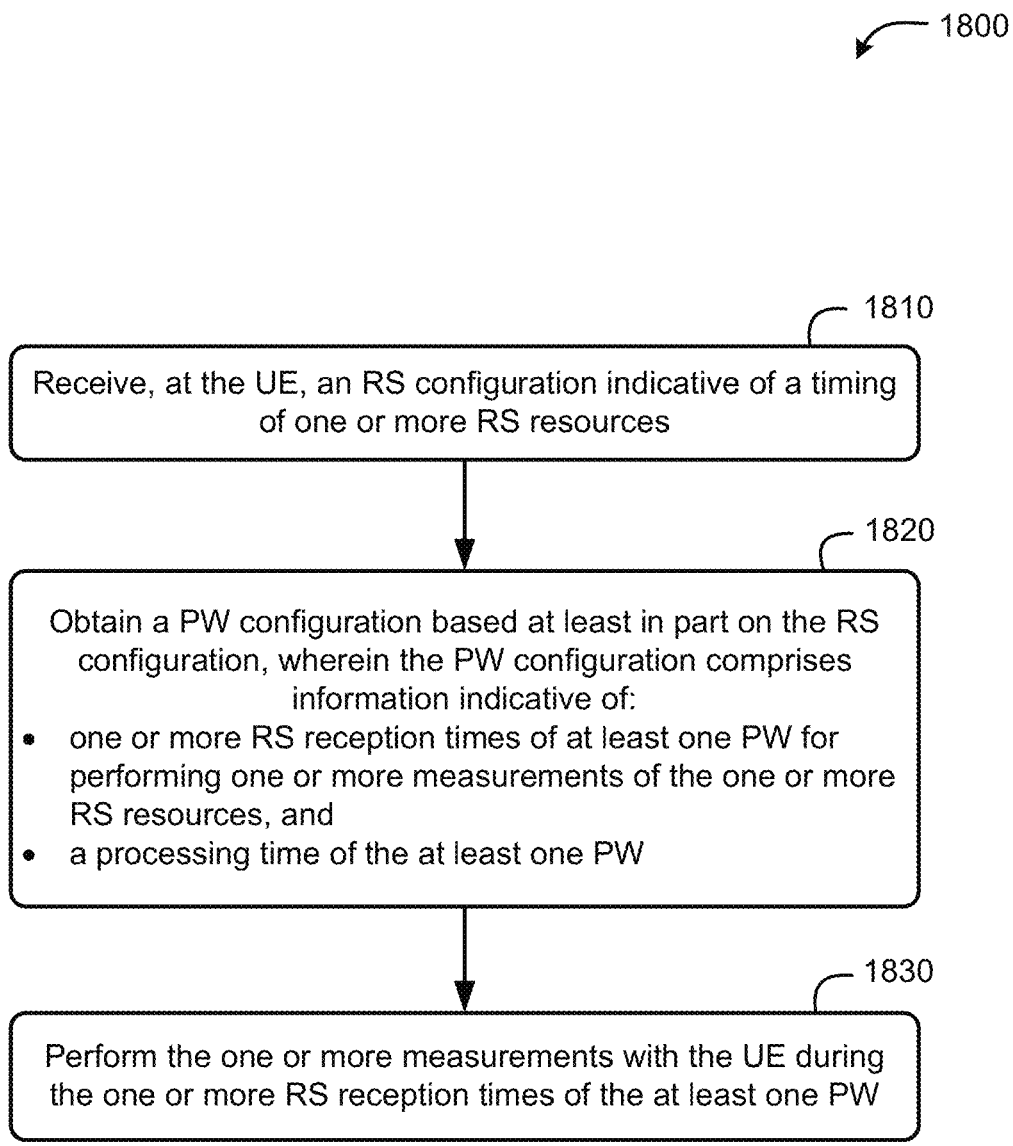
FIG. 18 is a flow diagram of a method of coordinating RS processing at a UE, according to an embodiment.

FIG. 18 is a flow diagram of a method 1800 of coordinating RS processing at a UE, according to an embodiment. Means for performing the functionality illustrated in one or more of the blocks shown in FIG. 18 may be performed by hardware and/or software components of a UE (e.g., a target UE). Example components of a UE are illustrated in FIG. 20, which is described in more detail below.

At block 1810, the functionality comprises receiving, at the UE, an RS configuration indicative of a timing of one or more RS resources. (The one or more RS resources transmitted by one or more wireless network nodes, such as base stations, UEs, etc.) This may correspond, for example, to the action at arrow 930 of FIG. 9 or the action at arrow 1030 of FIG. 10, as previously described. As indicated, the RS configuration is indicative of when one or more RS resources are to be transmitted. The RS configuration may further include information regarding a BWP, CC, RBs, and/or other frequency-related aspects of the RS resources, as well as comb number, periodicity, and/or other characteristics of the RS resources (e.g., as discussed herein with regard to FIG. 5).

Figure 20:
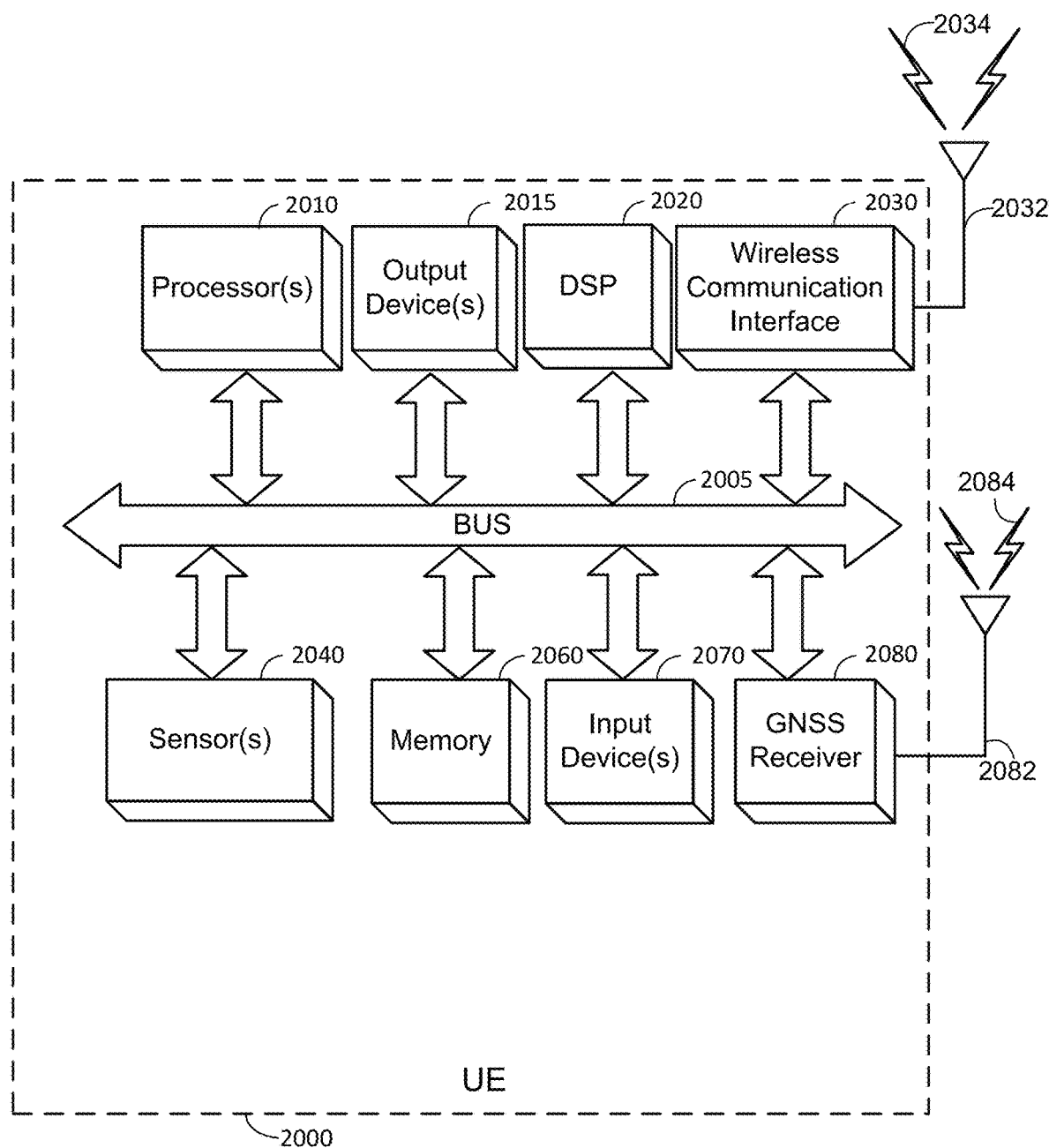
FIG. 20 is a block diagram of an embodiment of a UE, which can be utilized in embodiments as described herein.

Means for performing functionality at block 1810 may comprise bus 2005, processor(s) 2010, memory 2060, wireless communication interface 2030, and/or other components of a UE 2000 as illustrated in FIG. 20.

At block 1820, the functionality comprises obtaining a PW configuration based at least in part on the RS configuration, wherein the PW configuration comprises information indicative of (i) one or more RS reception times of at least one PW for performing one or more measurements of the one or more RS resources, and (ii) a processing time of the at least one PW. As described herein with regard to FIG. 11, the one or more RS reception times may comprise time blocks during which the UE may receive one or more RS resources. The RS processing time may comprise a time block during which received RS resources are processed (e.g., by performing correlation, Fast Fourier Transform (FFT), etc.) to obtain measurements of the RS resources.

As indicated in the previously-described embodiments, a UE may obtain a PW configuration in different ways. For example, according to some embodiments, obtaining the PW configuration comprises sending a request for the PW configuration from the UE to a serving base station of the UE, wherein the request includes information indicative of the RS configuration, and subsequent to sending the request, receiving the PW configuration from the serving base station of the UE. According to some embodiments, obtaining the PW configuration may comprise determining the PW configuration with the UE based on an application of one or more predetermined rules to the RS configuration. As previously indicated, determining a PW configuration may comprise applying rules to determine one or more PW fragments, then merging the one or more PW fragments when merger conditions exist. As such, according to some embodiments, the application of the one or more predetermined rules may comprise determining at least two PW fragments based on the RS configuration, and merging the at least two PW fragments. In such embodiments, merging the at least two PW fragments may be based on a determination that a first PW fragment of the at least two PW fragments is separated in time from a second PW fragment of the at least two PW fragments by less than a first threshold amount of time, or a determination that the first PW fragment of the at least two PW fragments overlaps a second PW fragment of the at least two PW fragments in time by less than a second threshold amount of time, or a combination thereof. According to some embodiments, the application of the one or more predetermined rules may comprise determining at least two PW fragments based on the RS configuration wherein a first PW fragment of the at least two PW fragments is separated in time from a second PW fragment of the at least two PW fragments by less than a first threshold amount of time.

Means for performing functionality at block 1820 may comprise bus 2005, processor(s) 2010, memory 2060, wireless communication interface 2030, and/or other components of a UE 2000 as illustrated in FIG. 20.

At block 1830, the functionality comprises performing the one or more measurements with the UE during the one or more RS reception times of the at least one PW. As indicated elsewhere herein, this may comprise receiving the one or more RS resources during the one or more RS reception times of the PW and processing the one or more RS resources during an RS processing time of the PW. Means for performing functionality at block 1830 may comprise bus 2005, processor(s) 2010, memory 2060, wireless communication interface 2030, and/or other components of a UE 2000 as illustrated in FIG. 20.

Depending on desired functionality, the method 1800 may include one or more additional operations, as indicated in the embodiments previously described. For example, according to some embodiments, the at least one PW may comprise a first PW separated in time from a second PW by a time gap caused by RS resource muting. According to some embodiments, the at least one PW may further comprise an UL RS transmission time, and wherein the method 1800 may further comprise performing an UL RS transmission during the UL RS transmission time of the at least one PW. According to some embodiments, obtaining the PW configuration may comprise selecting, by the UE, the PW configuration from a plurality of PW configurations provided to the UE by a serving base station of the UE. According to some embodiments, the PW configuration may further comprise information indicative of a starting time of the at least one PW, a duration of the at least one PW, a periodicity of the at least one PW, a priority of the one or more RS resources, or an indication of a bandwidth part (BWP) of the one or more RS resources, or a combination thereof. According to some embodiments, the method may further comprise sending UE capability information from the UE to a location server, wherein the RS configuration is received at the UE from the location server, responsive to sending the UE capability information. The at least one PW may further comprises a radio frequency (RF) chain tuning time, a period of time for non-RS communication, or an uplink (UL) RS transmission time, or a combination thereof. The one or more RS resources may comprise one or more Positioning Reference Signal (PRS) resources. According to some embodiments, the method 1800 may comprise sending information indicative of the one or more measurements from the UE to a location server.

Figure 19:
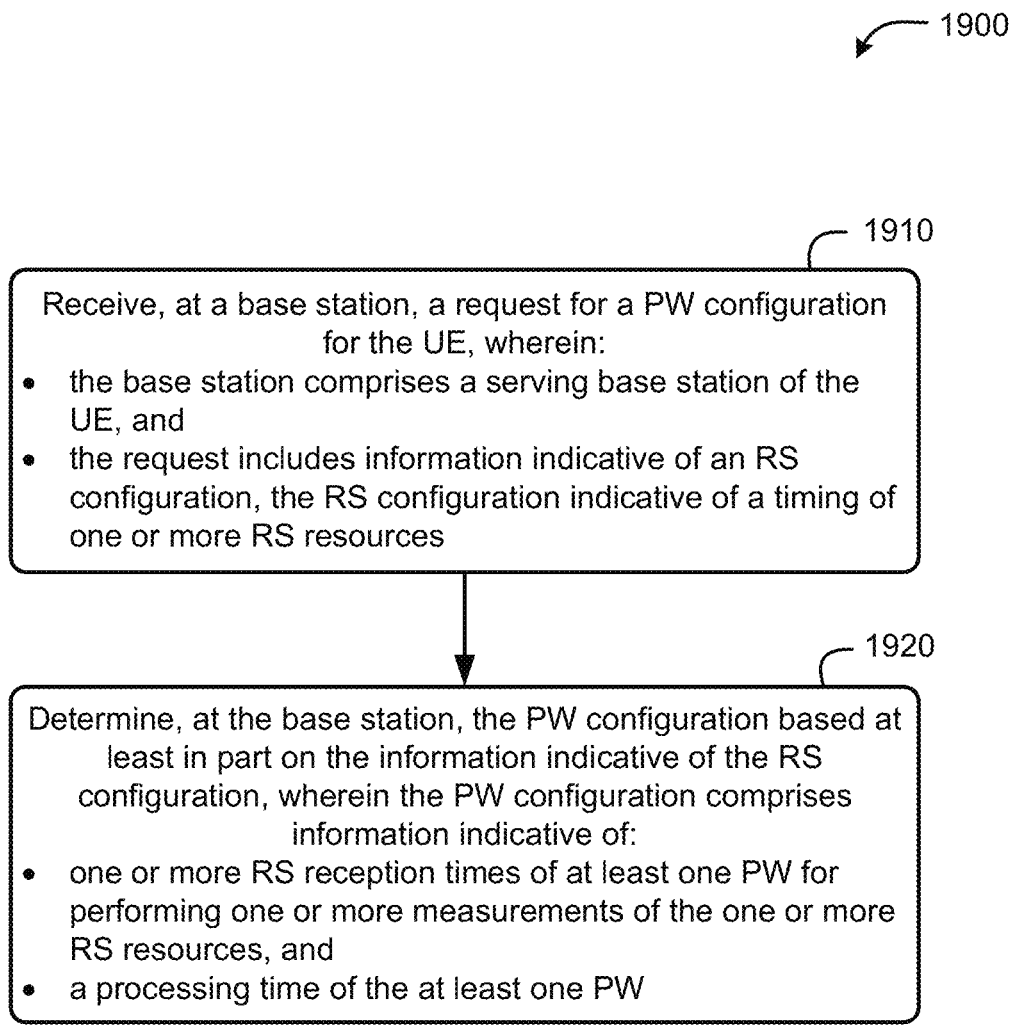
FIG. 19 is a flow diagram of a method of coordinating RS processing for a UE, according to an embodiment.

FIG. 19 is a flow diagram of a method 1900 of coordinating RS processing for a UE, according to an embodiment. Means for performing the functionality illustrated in one or more of the blocks shown in FIG. 19 may be performed by hardware and/or software components of a base station (e.g., the serving base station of the UE). Example components of a base station are illustrated in FIG. 21, which is described in more detail below.

At block 1910, the functionality comprises receiving, at the base station, a request for a PW configuration for the UE, wherein the base station comprises a serving base station of the UE, and the request includes information indicative of an RS configuration, the RS configuration indicative of a timing of one or more RS resources. As indicated in the previously-described embodiments, the request for the PW configuration may be received from the UE or a location server. As previously noted, the RS configuration may be include information regarding a BWP, CC, RBs, and/or other frequency-related aspects of the RS resources, as well as comb number, periodicity, and/or other characteristics of the RS resources (e.g., as discussed herein with regard to FIG. 5). The information indicative of the RS configuration, received in the request at block 1910, may include some or all of the information of the RS configuration.

Figure 21:
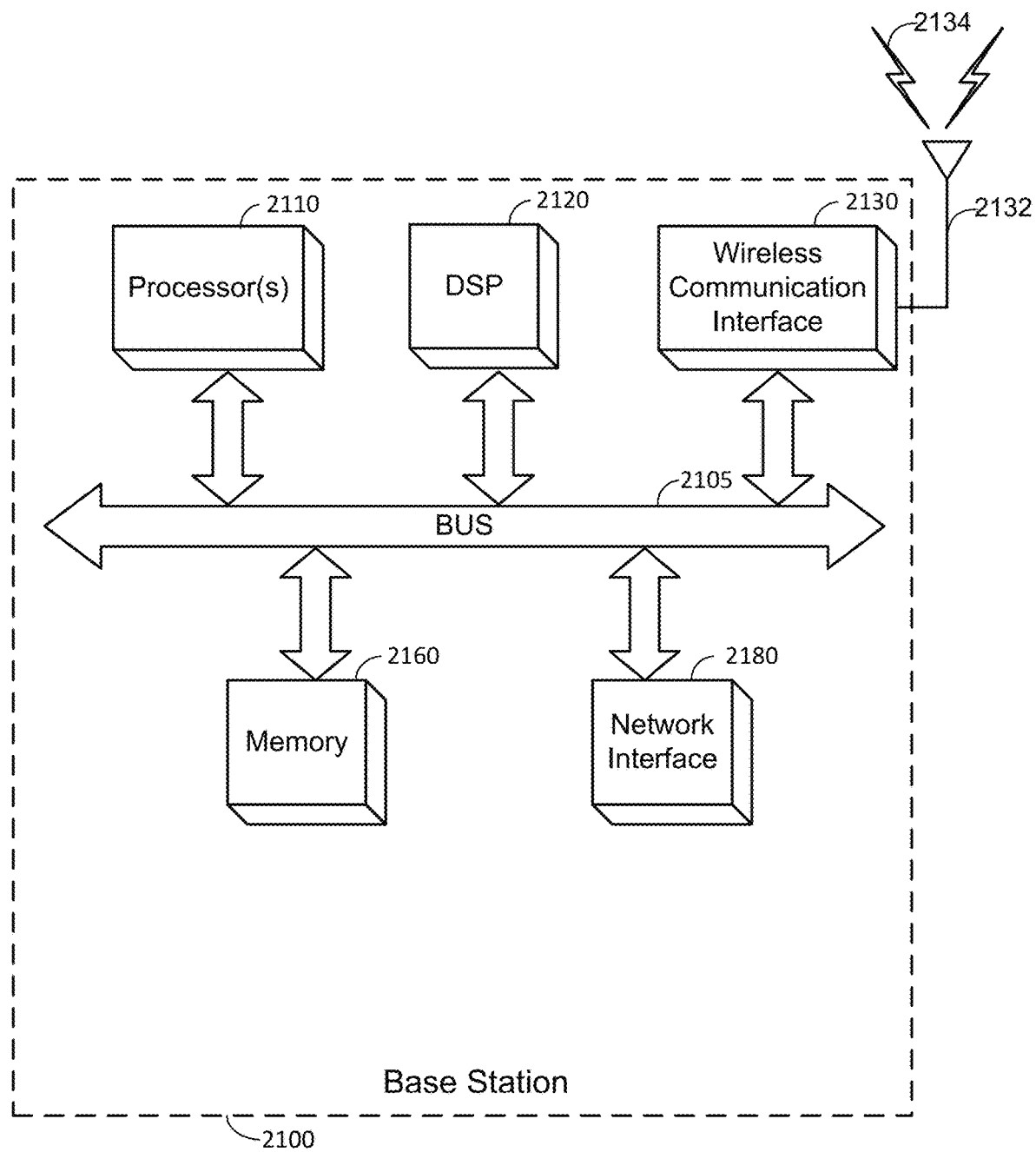
FIG. 21 is a block diagram of an embodiment of a base station, which can be utilized in embodiments as described herein.

Means for performing functionality at block 1910 may comprise bus 2105, processor(s) 2110, memory 2160, wireless communication interface 2130, and/or other components of a base station 2100 as illustrated in FIG. 21.

At block 1920, the functionality comprises determining, at the base station, the PW configuration based at least in part on the information indicative of the RS configuration, wherein the PW configuration comprises information indicative of one or more RS reception times of at least one PW for performing one or more measurements of the one or more RS resources, and a processing time of the at least one PW. Again, the one or more RS reception times may comprise time blocks during which the UE may receive one or more RS resources. The RS processing time may comprise a time block during which received RS resources are processed (e.g., by performing correlation, Fast Fourier Transform (FFT), etc.) to obtain measurements of the RS resources.

Different embodiments may implement the functionality at block 1920 differently, depending on desired functionality. According to some embodiments, determining the PW configuration may comprise determining the PW configuration based on an application of one or more predetermined rules to the information indicative of the RS configuration. According to some embodiments, the application of the one or more predetermined rules comprises determining at least two PW fragments based on the information indicative of the RS configuration, and merging the at least two PW fragments. Merging the at least two PW fragments may be based on a determination that a first PW fragment of the at least two PW fragments is separated in time from a second PW fragment of the at least two PW fragments by less than a first threshold amount of time, or a determination that the first PW fragment of the at least two PW fragments overlaps a second PW fragment of the at least two PW fragments in time by less than a second threshold amount of time, or a combination thereof. According to some embodiments, the application of the one or more predetermined rules comprises determining at least two PW fragments based on the information indicative of the RS configuration wherein a first PW fragment of the at least two PW fragments is separated in time from a second PW fragment of the at least two PW fragments by less than a first threshold amount of time.

Means for performing functionality at block 1920 may comprise bus 2105, processor(s) 2110, memory 2160, wireless communication interface 2130, and/or other components of a base station 2100 as illustrated in FIG. 21.

Embodiments of the method 1900 may include one or more additional operations, depending on desired functionality. According to some embodiments, the at least one PW may comprise a first PW separated in time from a second PW by a time gap caused by RS resource muting. According to some embodiments, the method 1900 may further comprise providing a plurality of PW configurations to the UE by the base station. The PW configuration may further comprise information indicative of a starting time of the at least one PW, a duration of the at least one PW, a periodicity of the at least one PW, a priority of the one or more RS resources, or an indication of a bandwidth part (BWP) of the one or more RS resources, or a combination thereof. The at least one PW may further comprise a radio frequency (RF) chain tuning time, a period of time for non-RS communication, or an uplink (UL) RS transmission time, or a combination thereof. According to some embodiments, the one or more RS resources comprise one or more Positioning Reference Signal (PRS) resources.

FIG. 20 is a block diagram of an embodiment of a UE 2000, which can be utilized as described herein above (e.g., in association with FIGS. 1-19), and may therefore correspond with the UE of other figures (e.g., UE 105). For example, the UE 2000 can perform one or more of the functions of the method shown in FIG. 18. It should be noted that FIG. 20 is meant only to provide a generalized illustration of various components, any or all of which may be utilized as appropriate. It can be noted that, in some instances, components illustrated by FIG. 20 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 20.

The UE 2000 is shown comprising hardware elements that can be electrically coupled via a bus 2005 (or may otherwise be in communication, as appropriate). The hardware elements may include a processor(s) 2010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 2010 may comprise one or more processing units, which may be housed in a single integrated circuit (IC) or multiple ICs. As shown in FIG. 20, some embodiments may have a separate DSP 2020, depending on desired functionality. Location determination and/or other determinations based on wireless communication may be provided in the processor(s) 2010 and/or wireless communication interface 2030 (discussed below). The UE 2000 also can include one or more input devices 2070, which can include without limitation one or more keyboards, touch screens, touch pads, microphones, buttons, dials, switches, and/or the like; and one or more output devices 2015, which can include without limitation one or more displays (e.g., touch screens), light emitting diodes (LEDs), speakers, and/or the like.

The UE 2000 may also include a wireless communication interface 2030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 2000 to communicate with other devices as described in the embodiments above. The wireless communication interface 2030 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs or base stations, as described herein. The communication can be carried out via one or more wireless communication antenna(s) 2032 that send and/or receive wireless signals 2034. According to some embodiments, the wireless communication antenna(s) 2032 may comprise a plurality of discrete antennas, antenna arrays, or any combination thereof. The antenna(s) 2032 may be capable of transmitting and receiving wireless signals using beams (e.g., Tx beams and Rx beams). Beam formation may be performed using digital and/or analog beam formation techniques, with respective digital and/or analog circuitry. The wireless communication interface 2030 may include such circuitry.

Depending on desired functionality, the wireless communication interface 2030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 2000 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 2000 can further include sensor(s) 2040. Sensor (s) 2040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 2000 may also include a Global Navigation Satellite System (GNSS) receiver 2080 capable of receiving signals 2084 from one or more GNSS satellites using an antenna 2082 (which could be the same as antenna 2032). Positioning based on GNSS signal measurement can be utilized to complement and/or incorporate the techniques described herein. The GNSS receiver 2080 can extract a position of the UE 2000, using conventional techniques, from GNSS satellites 110 of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 2080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 2080 is illustrated in FIG. 20 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 2010, DSP 2020, and/or a processor within the wireless communication interface 2030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 2010 or DSP 2020.

The UE 2000 may further include and/or be in communication with a memory 2060. The memory 2060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 2060 of the UE 2000 also can comprise software elements (not shown in FIG. 20), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 2060 that are executable by the UE 2000 (and/or processor(s) 2010 or DSP 2020 within UE 2000). In some embodiments, then, such code and/or instructions can be used to configure and/or adapt a general-purpose computer (or other device) to perform one or more operations in accordance with the described methods.

FIG. 21 is a block diagram of an embodiment of a base station 2100, which can be utilized as described herein above (e.g., in association with FIGS. 1-19) and may therefore correspond with a base station or TRP as described with respect to these other figures (e.g., base station 120, TRP 320, etc.). It should be noted that FIG. 21 is meant only to provide a generalized illustration of various components, any or all of which may be utilized as appropriate. In some embodiments, the base station 2100 may correspond to a gNB, an ng-eNB, and/or (more generally) a TRP.

The base station 2100 is shown comprising hardware elements that can be electrically coupled via a bus 2105 (or may otherwise be in communication, as appropriate). The hardware elements may include a processor(s) 2110 which can include without limitation one or more general-purpose processors, one or more special-purpose processors (such as DSP chips, graphics acceleration processors, ASICs, and/or the like), and/or other processing structure or means. As shown in FIG. 21, some embodiments may have a separate DSP 2120, depending on desired functionality. Location determination and/or other determinations based on wireless communication may be provided in the processor(s) 2110 and/or wireless communication interface 2130 (discussed below), according to some embodiments. The base station 2100 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 2100 might also include a wireless communication interface 2130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 2100 to communicate as described herein. The wireless communication interface 2130 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 2132 that send and/or receive wireless signals 2134.

The base station 2100 may also include a network interface 2180, which can include support of wireline communication technologies. The network interface 2180 may include a modem, network card, chipset, and/or the like. The network interface 2180 may include one or more input and/or output communication interfaces to permit data to be exchanged with a network, communication network servers, computer systems, and/or any other electronic devices described herein.

In many embodiments, the base station 2100 may further comprise a memory 2160. The memory 2160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 2160 of the base station 2100 also may comprise software elements (not shown in FIG. 21), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 2160 that are executable by the base station 2100 (and/or processor(s) 2110 or DSP 2120 within base station 2100). In some embodiments, then, such code and/or instructions can be used to configure and/or adapt a general-purpose computer (or other device) to perform one or more operations in accordance with the described methods.

Figure 22:
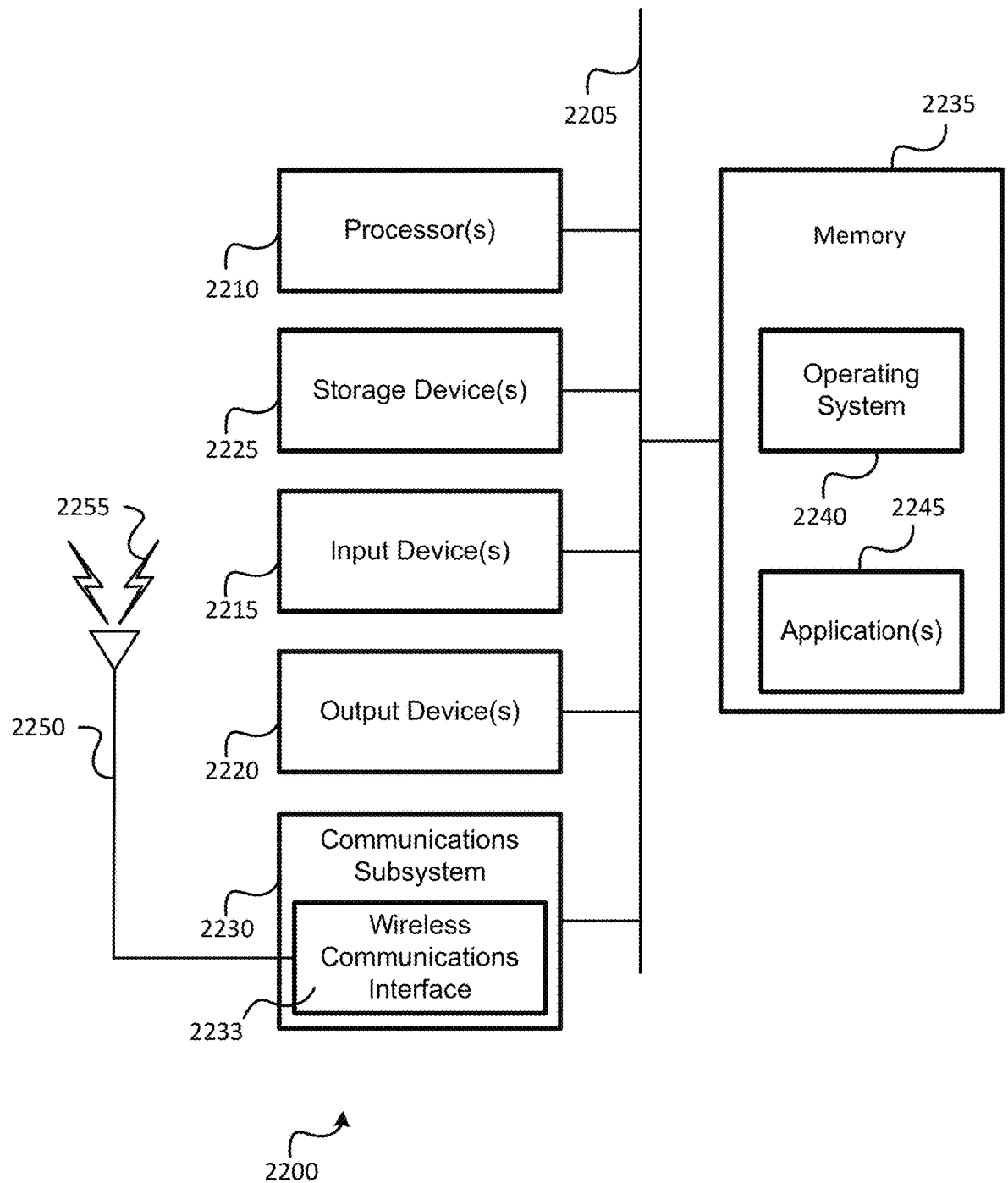
FIG. 22 is a block diagram of an embodiment of a computer system, which can be utilized in embodiments as described herein.

FIG. 22 is a block diagram of an embodiment of a computer system 2200, which may be used, in whole or in part, to provide the functions of one or more network components as described in the embodiments herein (e.g., location server 160 of FIG. 1, LMF of FIGS. 9 and 10, etc.). It should be noted that FIG. 22 is meant only to provide a generalized illustration of various components, any or all of which may be utilized as appropriate. FIG. 22, therefore, broadly illustrates how individual system elements may be implemented in a relatively separated or relatively more integrated manner. In addition, it can be noted that components illustrated by FIG. 22 can be localized to a single device and/or distributed among various networked devices, which may be disposed at different geographical locations.

The computer system 2200 is shown comprising hardware elements that can be electrically coupled via a bus 2205 (or may otherwise be in communication, as appropriate). The hardware elements may include processor(s) 2210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 2200 also may comprise one or more input devices 2215, which may comprise without limitation a mouse, a keyboard, a camera, a microphone, and/or the like; and one or more output devices 2220, which may comprise without limitation a display device, a printer, and/or the like.

The computer system 2200 may further include (and/or be in communication with) one or more non-transitory storage devices 2225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 2200 may also include a communications subsystem 2230, which may comprise wireless communication technologies managed and controlled by a wireless communication interface 2233, as well as wired technologies (such as Ethernet, coaxial communications, universal serial bus (USB), and the like). The wireless communication interface 2233 may comprise one or more wireless transceivers may send and receive wireless signals 2255 (e.g., signals according to 5G NR or LTE) via wireless antenna(s) 2250. Thus the communications subsystem 2230 may comprise a modem, a network card (wireless or wired), an infrared communication device, a wireless communication device, and/or a chipset, and/or the like, which may enable the computer system 2200 to communicate on any or all of the communication networks described herein to any device on the respective network, including a User Equipment (UE), base stations and/or other TRPs, and/or any other electronic devices described herein. Hence, the communications subsystem 2230 may be used to receive and send data as described in the embodiments herein.

In many embodiments, the computer system 2200 will further comprise a working memory 2235, which may comprise a RAM or ROM device, as described above. Software elements, shown as being located within the working memory 2235, may comprise an operating system 2240, device drivers, executable libraries, and/or other code, such as one or more applications 2245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 2225 described above. In some cases, the storage medium might be incorporated within a computer system, such as computer system 2200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 2200 and/or might take the form of source and/or installable code, which, upon compilation and/or installation on the computer system 2200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of coordinating reference signal (RS) processing at a user equipment (UE), the method comprising: receiving, at the UE, an RS configuration indicative of a timing of one or more RS resources; obtaining a processing window (PW) configuration based at least in part on the RS configuration, wherein the PW configuration comprises information indicative of: one or more RS reception times of at least one PW for performing one or more measurements of the one or more RS resources, and a processing time of the at least one PW; and performing the one or more measurements with the UE during the one or more RS reception times of the at least one PW.

Clause 2. The method of clause 1, wherein the at least one PW further comprises an uplink (UL) RS transmission time, and wherein the method further comprises performing an UL RS transmission during the UL RS transmission time of the at least one PW.

Clause 3. The method of any of clauses 1-2 wherein obtaining the PW configuration comprises: sending a request for the PW configuration from the UE to a serving base station of the UE, wherein the request includes information indicative of the RS configuration; and subsequent to sending the request, receiving the PW configuration from the serving base station of the UE.

Clause 4. The method of any of clauses 1-3 wherein obtaining the PW configuration comprises determining the PW configuration with the UE based on an application of one or more predetermined rules to the RS configuration.

Clause 5. The method of clause 4 wherein the application of the one or more predetermined rules comprises: determining at least two PW fragments based on the RS configuration; and merging the at least two PW fragments.

Clause 6. The method of clause 5 wherein merging the at least two PW fragments is based on: a determination that a first PW fragment of the at least two PW fragments is separated in time from a second PW fragment of the at least two PW fragments by less than a first threshold amount of time, or a determination that the first PW fragment of the at least two PW fragments overlaps a second PW fragment of the at least two PW fragments in time by less than a second threshold amount of time, or a combination thereof.

Clause 7. The method of clause 4 wherein the application of the one or more predetermined rules comprises determining at least two PW fragments based on the RS configuration wherein a first PW fragment of the at least two PW fragments is separated in time from a second PW fragment of the at least two PW fragments by less than a first threshold amount of time.

Clause 8. The method of any of clauses 1-3 or 7 wherein obtaining the PW configuration comprises selecting, by the UE, the PW configuration from a plurality of PW configurations provided to the UE by a serving base station of the UE.

Clause 9. The method of any of clauses 1-8 wherein the PW configuration further comprises information indicative of: a starting time of the at least one PW, a duration of the at least one PW, a periodicity of the at least one PW, a priority of the one or more RS resources, or an indication of a bandwidth part (BWP) of the one or more RS resources, or a combination thereof.

Clause 10. The method of any of clauses 1-9 further comprising sending UE capability information from the UE to a location server, wherein the RS configuration is received at the UE from the location server, responsive to sending the UE capability information.

Clause 11. The method of any of clauses 1-10 wherein the at least one PW further comprises: a radio frequency (RF) chain tuning time, a period of time for non-RS communication, or an UL RS transmission time, or a combination thereof.

Clause 12. The method of any of clauses 1-11 wherein the one or more RS resources comprise one or more Positioning Reference Signal (PRS) resources.

Clause 13. The method of any of clauses 1-12 wherein performing the one or more measurements with the UE during the one or more RS reception times of the at least one PW comprises assigning a higher priority for performing the one or more measurements than a priority of other data communication of the UE.

Clause 14. The method of any of clauses 1-13 further comprising sending information indicative of the one or more measurements from the UE to a location server.

Clause 15. A method of coordinating reference signal (RS) processing for a user equipment (UE), the method comprising: receiving, at a base station, a request for a processing window (PW) configuration for the UE, wherein: the base station comprises a serving base station of the UE, and the request includes information indicative of an RS configuration, the RS configuration indicative of a timing of one or more RS resources; and determining, at the base station, the PW configuration based at least in part on the information indicative of the RS configuration, wherein the PW configuration comprises information indicative of: one or more RS reception times of at least one PW for performing one or more measurements of the one or more RS resources, and a processing time of the at least one PW.

Clause 16. The method of clause 15, wherein the request for the PW configuration is received from the UE or a location server.

Clause 17. The method of any of clauses 15-16 further comprising sending the PW configuration from the base station to the UE.

Clause 18. The method of any of clauses 15-17 wherein determining the PW configuration comprises determining the PW configuration based on an application of one or more predetermined rules to the information indicative of the RS configuration.

Clause 19. The method of clause 18 wherein the application of the one or more predetermined rules comprises: determining at least two PW fragments based on the information indicative of the RS configuration; and merging the at least two PW fragments.

Clause 20. The method of clause 19 wherein merging the at least two PW fragments is based on: a determination that a first PW fragment of the at least two PW fragments is separated in time from a second PW fragment of the at least two PW fragments by less than a first threshold amount of time, or a determination that the first PW fragment of the at least two PW fragments overlaps a second PW fragment of the at least two PW fragments in time by less than a second threshold amount of time, or a combination thereof.

Clause 21. The method of clause 18 wherein the application of the one or more predetermined rules comprises determining at least two PW fragments based on the information indicative of the RS configuration wherein a first PW fragment of the at least two PW fragments is separated in time from a second PW fragment of the at least two PW fragments by less than a first threshold amount of time.

Clause 22. The method of any of clauses 15-21 wherein the at least one PW comprises a first PW separated in time from a second PW by a time gap caused by RS resource muting.

Clause 23. The method of any of clauses 15-22 further comprising providing a plurality of PW configurations to the UE by the base station.

Clause 24. The method of any of clauses 15-23 wherein the PW configuration further comprises information indicative of: a starting time of the at least one PW, a duration of the at least one PW, a periodicity of the at least one PW, a priority of the one or more RS resources, or an indication of a bandwidth part (BWP) of the one or more RS resources, or a combination thereof.

Clause 25. The method of any of clauses 15-24 wherein the at least one PW further comprises: a radio frequency (RF) chain tuning time, a period of time for non-RS communication, or an uplink (UL) RS transmission time, or a combination thereof.

Clause 26. The method of any of clauses 15-25 wherein the one or more RS resources comprise one or more Positioning Reference Signal (PRS) resources.

Clause 27. A user equipment (UE) for coordinating reference signal (RS) processing, the UE comprising: a transceiver; a memory; and one or more processors communicatively coupled with the transceiver and the memory, wherein the one or more processors are configured to: receive, via the transceiver, an RS configuration indicative of a timing of one or more RS resources; obtain a processing window (PW) configuration based at least in part on the RS configuration, wherein the PW configuration comprises information indicative of: one or more RS reception times of at least one PW for performing one or more measurements of the one or more RS resources, and a processing time of the at least one PW; and perform the one or more measurements, using the transceiver, during the one or more RS reception times of the at least one PW.

Clause 28. The UE of clause 27, wherein the one or more processors are further configured to perform an uplink (UL) RS transmission during an UL RS transmission time of the at least one PW.

Clause 29. The UE of any of clauses 27-28 wherein, to obtain the PW configuration, the one or more processors are configured to send a request for the PW configuration from the UE to a serving base station of the UE, wherein the request includes information indicative of the RS configuration; and subsequent to sending the request, receive the PW configuration from the serving base station of the UE.

Clause 30. The UE of any of clauses 27-29 wherein, to obtain the PW configuration, the one or more processors are configured to determine the PW configuration with the UE based on an application of one or more predetermined rules to the RS configuration.

Clause 31. The UE of clause 30 wherein, to perform the application of the one or more predetermined rules, the one or more processors are configured to determine at least two PW fragments based on the RS configuration; and merge the at least two PW fragments.

Clause 32. The UE of clause 31 wherein the one or more processors are configured to merge the at least two PW fragments based on: a determination that a first PW fragment of the at least two PW fragments is separated in time from a second PW fragment of the at least two PW fragments by less than a first threshold amount of time, or a determination that the first PW fragment of the at least two PW fragments overlaps a second PW fragment of the at least two PW fragments in time by less than a second threshold amount of time, or a combination thereof.

Clause 33. The UE of clause 30 wherein, to perform the application of the one or more predetermined rules, the one or more processors are configured to determine at least two PW fragments based on the RS configuration wherein a first PW fragment of the at least two PW fragments is separated in time from a second PW fragment of the at least two PW fragments by less than a first threshold amount of time.

Clause 34. The UE of any of clauses 27-29 or 33 wherein, to obtain the PW configuration, the one or more processors are configured to select the PW configuration from a plurality of PW configurations provided to the UE by a serving base station of the UE.

Clause 35. The UE of any of clauses 27-34 wherein, to obtain the PW configuration, the one or more processors are configured to obtain information indicative of a starting time of the at least one PW, a duration of the at least one PW, a periodicity of the at least one PW, a priority of the one or more RS resources, or an indication of a bandwidth part (BWP) of the one or more RS resources, or a combination thereof.

Clause 36. The UE of any of clauses 27-35 wherein the one or more processors are further configured to send UE capability information from the UE to a location server, via the transceiver, wherein the RS configuration is received at the UE from the location server, responsive to sending the UE capability information.

Clause 37. The UE of any of clauses 27-36 wherein the one or more RS resources comprise one or more Positioning Reference Signal (PRS) resources.

Clause 38. The UE of any of clauses 27-37 wherein, to perform the one or more measurements with the UE during the one or more RS reception times of the at least one PW, the one or more processors are configured to assign a higher priority for performing the one or more measurements than a priority of other data communication of the UE.

Clause 39. The UE of any of clauses 27-38 wherein the one or more processors are further configured to send information indicative of the one or more measurements from the UE to a location server via the transceiver.

Clause 40. A base station for coordinating reference signal (RS) processing for a user equipment (UE), the base station comprising: a transceiver; a memory; and one or more processors communicatively coupled with the transceiver and the memory, wherein the one or more processors are configured to: receive, via the transceiver, a request for a processing window (PW) configuration for the UE, wherein: the base station comprises a serving base station of the UE, and the request includes information indicative of an RS configuration, the RS configuration indicative of a timing of one or more RS resources; and determine the PW configuration based at least in part on the information indicative of the RS configuration, wherein the PW configuration comprises information indicative of: one or more RS reception times of at least one PW for performing one or more measurements of the one or more RS resources, and a processing time of the at least one PW.

Clause 41. The base station of clause 40, wherein the one or more processors are configured to receive the request for the PW configuration from the UE or a location server.

Clause 42. The base station of any of clauses 40-41 wherein the one or more processors are further configured to send the PW configuration from to the UE.

Clause 43. The base station of any of clauses 40-42 wherein the one or more processors are configured to determine the PW configuration based on an application of one or more predetermined rules to the information indicative of the RS configuration.

Clause 44. The base station of clause 43 wherein, to perform the application of the one or more predetermined rules, the one or more processors are configured to determine at least two PW fragments based on the information indicative of the RS configuration; and merge the at least two PW fragments.

Clause 45. The base station of any of clauses 40-44 wherein the one or more processors are configured to merge the at least two PW fragments based on: a determination that a first PW fragment of the at least two PW fragments is separated in time from a second PW fragment of the at least two PW fragments by less than a first threshold amount of time, or a determination that the first PW fragment of the at least two PW fragments overlaps a second PW fragment of the at least two PW fragments in time by less than a second threshold amount of time, or a combination thereof.

Clause 46. The base station of clause 45 wherein, to perform the application of the one or more predetermined rules, the one or more processors are configured to determine at least two PW fragments based on the information indicative of the RS configuration wherein a first PW fragment of the at least two PW fragments is separated in time from a second PW fragment of the at least two PW fragments by less than a first threshold amount of time.

Clause 47. The base station of any of clauses 40-46 wherein the one or more processors are further configured to provide a plurality of PW configurations to the UE by the base station.

Clause 48. The base station of any of clauses 40-47 wherein, to determine the PW configuration, the one or more processors are configured to determine information indicative of a starting time of the at least one PW, a duration of the at least one PW, a periodicity of the at least one PW, a priority of the one or more RS resources, or an indication of a bandwidth part (BWP) of the one or more RS resources, or a combination thereof.

Clause 49. The base station of any of clauses 40-48 wherein, to determine the PW configuration, the one or more processors are configured to determine a radio frequency (RF) chain tuning time, a period of time for non-RS communication, or an uplink (UL) RS transmission time, or a combination thereof.

Clause 50. The base station of any of clauses 40-49 wherein the one or more RS resources comprise one or more Positioning Reference Signal (PRS) resources.

Clause 51. An apparatus having means for performing the method of any one of clauses 1-26.

Clause 52. A non-transitory computer-readable medium storing instructions, the instructions comprising code for performing the method of any one of clauses 1-26.

What is claimed is:

1. A method of coordinating reference signal (RS) processing for a user equipment (UE), the method comprising:
   receiving, at a base station, a request for a processing window (PW) configuration for the UE, wherein:
      the base station comprises a serving base station of the UE, and
      the request includes information indicative of an RS configuration, the RS configuration indicative of a timing of one or more RS resources; and
   determining, at the base station, the PW configuration based at least in part on the information indicative of the RS configuration, wherein determining the PW configuration comprises determining the PW configuration based on an application of one or more predetermined rules to the information indicative of the RS configuration, wherein the application of the one or more predetermined rules comprises:
   determining at least two PW fragments based on the information indicative of the RS configuration wherein a first PW fragment of the at least two PW fragments is separated in time from a second PW fragment of the at least two PW fragments by less than a first threshold amount of time; and
   merging the at least two PW fragments, wherein the PW configuration comprises information indicative of:
      one or more RS reception times of at least one PW for performing one or more measurements of the one or more RS resources, and
      a processing time of the at least one PW.

2. The method of claim 1, wherein the request for the PW configuration is received from the UE or a location server.

3. The method of claim 1, further comprising sending the PW configuration from the base station to the UE.

4. The method of claim 1, wherein merging the at least two PW fragments is based on:
   the determination that the first PW fragment of the at least two PW fragments is separated in time from the second PW fragment of the at least two PW fragments by less than the first threshold amount of time, or
   a determination that the first PW fragment of the at least two PW fragments overlaps the second PW fragment of the at least two PW fragments in time by less than a second threshold amount of time, or
   a combination thereof.

5. The method of claim 1, wherein the at least one PW comprises a first PW separated in time from a second PW by a time gap caused by RS resource muting.

6. The method of claim 1, further comprising providing a plurality of PW configurations to the UE by the base station.

7. The method of claim 1, wherein the PW configuration further comprises information indicative of:
   a starting time of the at least one PW,
   a duration of the at least one PW,
   a periodicity of the at least one PW,
   a priority of the one or more RS resources, or
   an indication of a bandwidth part (BWP) of the one or more RS resources, or
   a combination thereof.

8. The method of claim 1, wherein the at least one PW further comprises:
   a radio frequency (RF) chain tuning time,
   a period of time for non-RS communication, or
   an uplink (UL) RS transmission time, or
   a combination thereof.

9. The method of claim 1, wherein the one or more RS resources comprise one or more Positioning Reference Signal (PRS) resources.

10. A base station for coordinating reference signal (RS) processing for a user equipment (UE), the base station comprising:
   one or more transceivers;
   one or more memories; and
   one or more processors communicatively coupled with the one or more transceivers and the one or more memories, wherein the one or more processors are configured to:
      receive, via the one or more transceivers, a request for a processing window (PW) configuration for the UE, wherein:
         the base station comprises a serving base station of the UE, and
         the request includes information indicative of an RS configuration, the RS configuration indicative of a timing of one or more RS resources; and
      determine the PW configuration based at least in part on the information indicative of the RS configuration and based on an application of one or more predetermined rules to the information indicative of the RS configuration, wherein to perform the application of the one or more predetermined rules, the one or more processors are configured to:
         determine at least two PW fragments based on the information indicative of the RS configuration wherein a first PW fragment of the at least two PW fragments is separated in time from a second PW fragment of the at least two PW fragments by less than a first threshold amount of time; and merge the at least two PW fragments, wherein the PW configuration comprises information indicative of:
one or more RS reception times of at least one PW for performing one or more measurements of the one or more RS resources, and
a processing time of the at least one PW.

11. The base station of claim 10, wherein the one or more processors are configured to receive the request for the PW configuration from the UE or a location server.

12. The base station of claim 10, wherein the one or more processors are further configured to send the PW configuration from to the UE.

13. The base station of claim 10, wherein the one or more processors are configured to merge the at least two PW fragments based on:
the determination that the first PW fragment of the at least two PW fragments is separated in time from the second PW fragment of the at least two PW fragments by less than the first threshold amount of time, or
a determination that the first PW fragment of the at least two PW fragments overlaps the second PW fragment of the at least two PW fragments in time by less than a second threshold amount of time, or
a combination thereof.

14. The base station of claim 10, wherein the one or more processors are further configured to provide a plurality of PW configurations to the UE by the base station.

15. The base station of claim 10, wherein, to determine the PW configuration, the one or more processors are configured to determine information indicative of:
a starting time of the at least one PW,
a duration of the at least one PW,
a periodicity of the at least one PW,
a priority of the one or more RS resources, or
an indication of a bandwidth part (BWP) of the one or more RS resources, or
a combination thereof.

16. The base station of claim 10, wherein, to determine the PW configuration, the one or more processors are configured to determine:
a radio frequency (RF) chain tuning time,
a period of time for non-RS communication, or
an uplink (UL) RS transmission time, or
a combination thereof.

17. The base station of claim 10, wherein the one or more RS resources comprise one or more Positioning Reference Signal (PRS) resources.

* * * * *